US007711560B2

(12) United States Patent
Yamada et al.

(10) Patent No.: US 7,711,560 B2
(45) Date of Patent: May 4, 2010

(54) SPEECH RECOGNITION DEVICE AND SPEECH RECOGNITION METHOD

(75) Inventors: Maki Yamada, Kawasaki (JP); Makoto Nishizaki, Tokyo (JP); Yoshihisa Nakatoh, Yokohama (JP); Shinichi Yoshizawa, Hirakata (JP)

(73) Assignee: Panasonic Corporation, Osaka (JP)

( * ) Notice: Subject to any disclaimer, the term of this patent is extended or adjusted under 35 U.S.C. 154(b) by 1142 days.

(21) Appl. No.: 10/504,926

(22) PCT Filed: Feb. 4, 2004

(86) PCT No.: PCT/JP2004/001109

§ 371 (c)(1),
(2), (4) Date: Aug. 19, 2004

(87) PCT Pub. No.: WO2004/075168

PCT Pub. Date: Sep. 2, 2004

(65) Prior Publication Data

US 2005/0256712 A1    Nov. 17, 2005

(30) Foreign Application Priority Data

Feb. 19, 2003  (JP) ............................. 2003-041129
Jul. 29, 2003   (JP) ............................. 2003-281625

(51) Int. Cl.
    *G10L 15/28* (2006.01)
(52) U.S. Cl. ................. 704/255; 704/243; 704/258; 704/270; 704/247; 704/275; 704/234; 704/251; 704/231; 700/245; 715/751
(58) Field of Classification Search ................. 704/243, 704/251, 258, 270, 247, 275, 234, 231; 700/245; 715/751
See application file for complete search history.

(56) References Cited

U.S. PATENT DOCUMENTS 4,736,429 A * 4/1988 Niyada et al. ............... 704/254

(Continued)

FOREIGN PATENT DOCUMENTS

JP    08-339446    12/1996
JP    2003-202885   7/2003

OTHER PUBLICATIONS

Inoue et al., "A Method to Deal with Out-of-Vocabulary Words in Spontaneous Speech by Using Garbage HMM",, The Transactions of the Institute of Electronics, Information and Communication Engineers A, Feb. 25, 1994, vol. J77-A, No. 2, pp. 215-222.

(Continued)

*Primary Examiner*—Richemond Dorvil
*Assistant Examiner*—Michael C Colucci
(74) *Attorney, Agent, or Firm*—Wenderoth, Lind & Ponack, L.L.P.

(57) ABSTRACT

A speech recognition apparatus equipped with the garbage acoustic model storage unit storing the garbage acoustic model which learned the collection of unnecessary words. A feature value calculation unit calculates the feature parameter necessary for recognition by acoustically analyzing the unidentified input speech including the non-language speech per frame which is a unit for speech analysis. A garbage acoustic score calculation unit calculates the garbage acoustic score by comparing the feature parameter and the garbage acoustic model, and a garbage acoustic score correction unit corrects the garbage acoustic score calculated by the garbage acoustic score calculation unit so as to raise it in the frame where the non-language speech is inputted. A recognition result output unit outputs, as the recognition result of the unidentified input speech, the word string with the highest cumulative score of the language score, the word acoustic score, and the garbage acoustic score which is corrected by the garbage acoustic score correcting unit.

14 Claims, 13 Drawing Sheets

U.S. PATENT DOCUMENTS

| | | | | |
|---|---|---|---|---|
| 4,817,159 | A * | 3/1989 | Hoshimi et al. | 704/254 |
| 4,979,212 | A * | 12/1990 | Yamada et al. | 704/234 |
| 5,033,089 | A * | 7/1991 | Fujimoto et al. | 704/247 |
| 5,151,940 | A * | 9/1992 | Okazaki et al. | 704/253 |
| 5,339,385 | A * | 8/1994 | Higgins | 704/246 |
| 5,440,662 | A * | 8/1995 | Sukkar | 704/236 |
| 5,577,165 | A * | 11/1996 | Takebayashi et al. | 704/275 |
| 5,822,730 | A * | 10/1998 | Roth et al. | 704/255 |
| 5,832,429 | A * | 11/1998 | Gammel et al. | 704/255 |
| 5,842,165 | A * | 11/1998 | Raman et al. | 704/255 |
| 5,895,448 | A * | 4/1999 | Vysotsky et al. | 704/270.1 |
| 5,946,655 | A * | 8/1999 | Steinbiss et al. | 704/251 |
| 6,058,363 | A * | 5/2000 | Ramalingam | 704/251 |
| 6,076,054 | A * | 6/2000 | Vysotsky et al. | 704/240 |
| 6,223,155 | B1 * | 4/2001 | Bayya | 704/243 |
| 6,226,612 | B1 * | 5/2001 | Srenger et al. | 704/256.2 |
| 6,275,800 | B1 * | 8/2001 | Chevalier et al. | 704/246 |
| 6,292,778 | B1 * | 9/2001 | Sukkar | 704/256.4 |
| 6,535,850 | B1 * | 3/2003 | Bayya | 704/239 |
| 6,542,866 | B1 * | 4/2003 | Jiang et al. | 704/255 |
| 6,671,669 | B1 * | 12/2003 | Garudadri et al. | 704/255 |
| 6,708,081 | B2 * | 3/2004 | Yoshida | 700/245 |
| 6,836,758 | B2 * | 12/2004 | Bi et al. | 704/231 |
| 7,007,235 | B1 * | 2/2006 | Hussein et al. | 715/751 |
| 7,076,430 | B1 * | 7/2006 | Cosatto et al. | 704/275 |
| 7,447,635 | B1 * | 11/2008 | Konopka et al. | 704/239 |
| 2002/0107695 | A1 * | 8/2002 | Roth et al. | 704/275 |
| 2002/0116193 | A1 * | 8/2002 | Raddino et al. | 704/251 |
| 2002/0194002 | A1 * | 12/2002 | Petrushin | 704/270 |
| 2003/0078780 | A1 * | 4/2003 | Kochanski et al. | 704/258 |
| 2004/0006468 | A1 * | 1/2004 | Gupta et al. | 704/254 |
| 2004/0024599 | A1 * | 2/2004 | Deisher | 704/256 |

OTHER PUBLICATIONS

Kai et al., "Comparison of Continuous Speech Recognition Systems with Unknown Word Processing for Speech Disfluencies", The Transactions of the Institute of Electronics, Information and Communication Engineers D-II, Oct. 25, 1997, vol. J80-D-II, No. 10, pp. 2615-2625.

Okumura et al., "Adaptations of Speech Recognition to Stuttered Utterances", The Institute of Electronics, Information and Communication Engineers Gijutsu Kenkyu Hokoku [Onsei], Jan. 20, 2000, vol. 99, No. 576, SP99-135, pp. 29-36 (English Abstract).

Kaneda et al., "Onkyo Jokei Jimaku Hyoji no Tame no Waraigoe no Kento", The Acoustical Society of Japan (ASJ) 2001 Nen Shunki Kenkyu Happyokai Koen Ronbunshu -I-, Mar. 14, 2001, 3-P-3, pp. 169-170.

Sy et al., "A Statistical Causal Model for the Assessment of Dysarthric Speech and the Utility of Computer-Based Speech Recognition", IEEE Transactions on Biomedical Engineering, Dec. 1993, vol. 40, No. 12, pp. 1282-1298.

Privat et al., "Accessibility and Affordance for Voice XML Technology", Proceeding of the 8th International Conference on Computers Helping People with Special Needs (ICCHP 2002), Jul. 2002, pp. 61-63.

* cited by examiner

FIG. 11

>Yes, that's right.
(^O^)

901

SPEECH RECOGNITION DEVICE AND SPEECH RECOGNITION METHOD

TECHNICAL FIELD

The present invention relates to a speech recognition apparatus which accepts unnecessary words that do not need translation and recognizes a speech of connected words, and to a speech recognition method.

BACKGROUND ART

There is a conventional word speech recognition apparatus that deals with unnecessary words that do not need translation, using a garbage acoustic model that has learned a collection of unnecessary words (refer to "The Processing Method of Unnecessary Words in Free Conversational Sentences Using the Garbage HMM" by Naoki Inoue and other two, Academic Journal of Electronic Information and Communication A, Vol. J77-A, No. 2, pp. 215-222, February, 1994).

FIG. 1 shows a structure of the conventional speech recognition apparatus;

As FIG. 1 shows, the conventional speech recognition apparatus comprises: the feature value calculation unit 1201, the network dictionary storage unit 1202, the path calculation unit 1203, the path candidate storage unit 1204, the recognition result output unit 1205, the language model storage unit 1206, the language score calculation unit 1207, the word acoustic model storage unit 1208, the word acoustic score calculation unit 1209, the garbage acoustic model storage unit 1210, and the garbage acoustic score calculation unit 1211.

The feature value calculation unit 1201 analyzes the unidentified input speech, and calculates the feature parameter necessary for recognition. The network dictionary storage unit 1202 stores the network dictionary wherein the list of the words that the speech recognition apparatus can accept is recorded. The path calculation unit 1203 calculates the cumulative score of the path for finding the optimum word string of the unidentified input speech, using the record of the network dictionary. The path candidate storage unit 1204 stores the information of the path candidate. The recognition result output unit 1205 outputs the word string whose final score is the highest as the recognition result.

Also, the language model storage unit 1206 stores the language model that has statistically learned the probability of the appearing words in advance. The language score calculation unit 1207 calculates the language score which is the probability of the word appearing in link with the previous word. The word acoustic model storage unit 1208 stores, in advance, the word acoustic model corresponding to the recognition subject vocabulary. The word acoustic score calculation unit 1209 calculates the word acoustic score by comparing the feature parameter and the word acoustic model.

In addition, the garbage acoustic model storage unit 1210 stores the garbage acoustic model that has learned a collection of unnecessary words that do not need translation such as "Ehmm" and "Uhmm". The garbage acoustic score calculation unit 1211 calculates the garbage acoustic score which is the appearing probability of the unnecessary words (the garbage model) by comparing the feature parameter and the garbage acoustic model.

Next, the operations performed by each unit of the conventional speech recognition apparatus will be explained as following.

First, the unidentified input speech a user has uttered is inputted into the feature value calculation unit 1201. Then, the feature value calculation unit 1201 calculates the feature parameter by analyzing the speech of each frame that is a time unit for speech analysis. Here, the length of a frame is 10 ms.

The path calculation unit 1203 refers to the network dictionary, where the acceptable word connections are recorded, stored in the network dictionary storage unit 1202. Then, the path calculation unit 1203 calculates the cumulative score of the path candidate to the corresponding frame, and registers the information of the path candidate in the path candidate storage unit 1204.

FIG. 2 shows the path candidate in the case where the input speeches are "Sore wa, da, dare". FIG. 2(a) shows the input speeches with the words separation. FIG. 2(b) shows the path candidate in the case where the input frame is "t-1". FIG. 2(c) shows the path candidate in the case where the input frame is "t". The horizontal axis shows the frames. Here, the unnecessary stuttering word, "da", is recognized as a garbage model. The garbage model is provided with a path in the same way as a word.

Here, the paths 511, 512, 513 and 52 are the non-optimum paths to some midpoint of the words. The paths 521 and 522 are the optimum paths that have reached the end of the words. The paths 531 and 532 are the non-optimum paths that have reached the end of the words. The path 54 is the optimum path to some midpoint of the word.

The path calculation unit 1203 calculates the cumulative score for each path by extending the paths from each path candidate of the frame which precedes the corresponding frame by one frame.

FIG. 2(b) shows the path candidates in the "t-1" frame which is the frame preceding the corresponding frame "t" by one frame. This information of the path candidates is stored in the path candidate storage unit 1204. The paths are extended from these path candidates as shown in the frame "t" of FIG. 2(c). Some paths extend the words of the path candidates in the preceding frame; others finish the words of the path candidates in the preceding frame, and start the new words connectable to the previous words. Here, the connectable words are the ones recorded in the network dictionary.

In FIG. 2(b) in the frame "t-1", there are (i) the word, "wata", of the non-optimum path 511 that is at some midpoint of the word, and (ii) the word, "wata", of the optimum path 521 that has reached the end of the word. In FIG. 2(c) in the frame "t", (i) the word, "wata", of the non-optimum path 511 is further extended, (ii) the word, "wata", of the optimum path 521 is connected to the word, "tane", of the optimum path 54 that is at some midpoint of the word, and also to the word, "gashi" of the non-optimum path 512 that is at some midpoint of the word.

Next, the language score and the acoustic score are calculated for each of the extended path candidates.

The language score is calculated by the language score calculation unit 1207 using the language model stored in the language model storage unit 1206. As the language score, the logarithm value of the bigram probability is used, said bigram probability being the probability of the words that connect to the previous words. Here, in the optimum path 522 that has reached the end of the word, wherein "wata" connects to "sore", the appearance probability of "wata" after "sore" is used. The language score is calculated per one word.

The acoustic score is calculated in relation to the input feature parameter vector (i) by the word acoustic score calculation unit 1209 using the word acoustic model stored in the word acoustic model storage unit 1208, in the case where the corresponding path candidate is a word and (ii) by the garbage acoustic score calculation unit 1211 using the garbage acoustic model stored in the garbage acoustic model storage unit

1210, in the case where the corresponding path candidate is an unnecessary word (a garbage model).

For instance, in FIG. 2(*b*) in the frame "t-1", the paths for calculating the acoustic score are the four paths. The paths which use the word acoustic model are: "wata" of the path 511 connecting to "sore" of the path 522, "wata" of the path 521 connecting to "sore" of the path 522, and "dare" of the path 513 connecting to "wa" of the path 531. The path which uses the garbage acoustic model is "the garbage model" of the path 532 connecting to "wa" of the path 531.

As the acoustic model, in general, the hidden Markov model (HMM) which has stochastically modeled the acoustic features is used. The HMM that represents the acoustic features of words is called the word acoustic model. The HMM that represents a collection of the acoustic features of the unnecessary words that do not need translation, such as "Ehmm" and "Uhmm", as one model is called the garbage acoustic model. The word acoustic score and the garbage acoustic score are the logarithm values of the probability acquired from the HMM, and show the appearance probability of the word and the garbage models.

The language score and the acoustic score acquired, as described above, are combined as a comparative score, and the cumulative score of each path is calculated by the Viterbi algorithm (refer to "Speech Recognition by the Probability Model" by Seiichi Nakagawa, edited by the Association of the Electronic Information and Communications, pp. 44-46, first published in 1988).

However, it is not preferable to simply record all of the extended path candidates because the amount of calculation and the amount of memory increase enormously. Therefore, a beam search, which leaves only "K" ("K" is a natural number) extended path candidates in the order of the high cumulative score for each frame, is used. The information of the "K" path candidates is registered in the path candidate storage unit 1204.

The processes as described above are repeated forwarding the input frame by one.

Finally, after all the frame processing is completed, the recognition result output unit 1205 outputs the word string of the path candidates as the recognition result, said word string having the highest cumulative score among the candidate paths stored in the candidate path storage unit 1204.

However, in such conventional example as described above, there is a problem that the speech recognition apparatus makes a wrong recognition in the case where there is a word string acoustically similar to the non-language speech such as a stuttering speech.

Here, stuttering speech means an unfluent speech production in which the first speech or the middle speech is clogged, the same speeches are repeated many times, and some speeches are stretched.

In FIG. 2(*c*) the number in the parentheses above each word is the comparative score for each word.

In FIG. 2(*c*) the right answer is that the stuttering part of the unidentified input speech, "da", passes through the garbage model, and the path 52 connecting "dare" to "da" becomes the optimum path in the frame "t". In the case of "sore"+"wata", 7+10=17 points, in the case of "sore"+"wata"+"tane", 7+9+2=18 points, in the case of "sore"+"wata"+"gashi", 7+9+1=17 points, in the case of "sore"+"wa"+"dare", 7+5+4=16 points, and in the case of "sore"+"wa"+the garbage model+ "dare", 7+5+2+1=15 points. Thus, the word string of "sore"+ "wata"+"tane" has the highest score in the frame.

The reason for the result described above is as following. The garbage acoustic model learns from all of the acoustic data which has the unnecessary words including stuttering speeches. Such large distribution of the unnecessary words prevents the speech production of unnecessary words, that is, non-language speeches from acquiring high acoustic scores.

In order to solve this problem, there is a method to boost all of the garbage acoustic scores. However, with this method, the garbage acoustic score is high even in the frame where the optimum path does not have unnecessary words. Therefore, the speech recognition apparatus makes a wrong recognition.

An object of the present invention, in view of the above problem, is to provide a speech recognition apparatus that can correctly recognize unidentified input speeches even if they include unnecessary words, in particular, non-language speeches such as stuttering speeches.

SUMMARY OF THE INVENTION

In order to achieve such object as described above, the speech recognition apparatus according to the present invention calculates, per path, a cumulative score of a language score, a word acoustic score and a garbage acoustic score and outputs a word string with a highest cumulative score as a recognition result of an unidentified input speech including a non-language speech. The speech recognition apparatus includes: a garbage acoustic model storage unit operable to store, in advance, a garbage acoustic model which is an acoustic model learned from a collection of unnecessary words; a feature value calculation unit operable to calculate a feature parameter necessary for recognition by acoustically analyzing the unidentified input speech, per frame, which is a unit for speech analysis; a garbage acoustic score calculation unit operable to calculate the garbage acoustic score by comparing the feature parameter and the garbage acoustic model per frame; a garbage acoustic score correction unit operable to correct the garbage acoustic score calculated by the garbage acoustic score calculation unit so as to raise the score in the frame where the non-language speech is inputted; and a recognition result output unit operable to output the word string as the recognition result of the unidentified input speech, the word string having the highest cumulative score of the language score, the word acoustic score, and the garbage acoustic score corrected by the garbage acoustic score correction unit.

Thus, it is possible to raise only a garbage acoustic score which corresponds to a non-language speech, and an unidentified input speech can be correctly recognized.

Also, the speech recognition apparatus according to the present invention further comprises a non-language speech estimation unit operable to calculate, per frame, an estimate value which indicates a degree of likelihood to be a non-language speech of the non-language speech, using a non-language speech estimate function, wherein the garbage acoustic score correction unit corrects the garbage acoustic score so as to raise said score by using the estimate value calculated by the non-language speech estimation unit in the frame where the non-language speech is inputted.

Thus, (i) a non-language speech can be estimated by the non-language speech estimation unit, (ii) a garbage acoustic score which corresponds to the non-language speech can be raised, and (iii) the unidentified input speech can be accurately recognized.

In addition, in the speech recognition apparatus according to the present invention, the non-language speech estimation unit calculates an estimate value which is high in a part where spectra of the unidentified input speech become repeating patterns based on the feature parameter calculated, per frame, by the feature value calculation unit.

Thus, by detecting repeating patterns of spectra of an unidentified input speech, a non-language speech such as a stuttering speech can be accurately estimated as a garbage model.

Moreover, the speech recognition apparatus according to the present invention comprises a non-language estimation specific feature value calculation unit operable to calculate, per frame, the non-language estimation specific feature parameter which is necessary for estimating the non-language speech; a non-language acoustic model storage unit operable to store, in advance, a non-language acoustic model which is an acoustic model modeling the features of non-languages, wherein the non-language speech estimation unit calculates, per frame, a non-language comparative score as the estimate value by comparing the feature parameter for estimating the non-language and the non-language acoustic model.

Thus, by comparing the non-language acoustic model and the feature parameter which is necessary for estimating a non-language speech said feature parameter being different from a feature parameter for recognizing speech, a non-language speech can be accurately estimated. Therefore, a garbage acoustic score which corresponds to a non-language speech can be raised, and an unidentified input speech can be correctly recognized.

Moreover, the speech recognition apparatus according to the present invention further comprises a high frequency power retaining frame number calculation unit operable to calculate the number of frames that retain high frequency power, based on the feature parameter for estimating the non-language which is calculated by the non-language estimation specific feature value calculation unit, wherein the non-language speech estimation unit (i) calculates the non-language comparative score by comparing the feature parameter for estimating the non-language and the non-language acoustic model, and (ii) calculates the estimate value which indicates the likelihood to be the non-language from the non-language comparative score and the high frequency power retaining frame number.

Thus, by using (a) a comparative score, calculated, with the non-language acoustic model, by the feature parameter which is necessary for estimating a non-language speech, said feature parameter being different from a feature parameter for recognizing speech, and (b) the number of frames where high-frequency power is retained, (i) a non-language speech can be estimated, (ii) a garbage acoustic score which corresponds to a non-language speech can be raised, and (iii) an unidentified input speech can be accurately recognized.

Also, in the speech recognition apparatus according to the present invention, the high frequency power retaining frame number calculation unit regards the high frequency power acquired by the feature value calculation unit operable to estimate the non-language as the frame of "high" high frequency power in a case where the high frequency power is higher than the predetermined threshold value.

Thus, the number of frames where high power is retained can be easily calculated.

Furthermore, the speech recognition apparatus according to the present invention further comprises a non-language corresponding character insert unit operable to (i) select at least either of an ideogram and an emoticon corresponding to the non-language speech, based on the estimate value estimated by the non-language speech estimation unit and (ii) insert at least either of the selected ideogram and emoticon into the recognition result of the recognition result output unit.

Thus, not only the recognition performance is improved, but also it is possible to make a mail automatically inserting an ideogram or an emoticon which indicate a corresponding non-language speech by using an estimate value.

Also, the speech recognition apparatus according to the present invention further comprises an agent control unit operable to control an agent's movement which is displayed on a screen and composite tones of an agent's speech, based on the recognition result outputted by the recognition result output unit and the estimate value estimated by the non-language speech estimation unit.

Thus, by using a recognition result and an estimate value, a response such as an agent's movement and speech can be changed depending on a non-language speech.

Moreover, the speech recognition apparatus according to the present invention further comprises a non-language phenomenon estimation unit operable to calculate an estimate value of a non-language phenomenon which is related to said non-language speech, based on user's information interlocking the non-language speech, wherein the garbage acoustic score correction unit corrects the garbage acoustic score, so as to raise said score using the estimate value in the frame where the non-language phenomenon which is calculated by the non-language phenomenon estimation unit is inputted.

Thus, (i) a non-language phenomenon can be estimated by the non-language estimation unit, (ii) a garbage acoustic score can be raised according to the non-language phenomenon, and (iii) an unidentified input speech can be accurately recognized.

In addition, the speech recognition apparatus according to the present invention further comprises a non-language character insert unit operable to (i) select at least either of an ideogram and an emoticon corresponding to the non-language speech, based on the estimate value estimated by the non-language phenomenon estimation unit, and (ii) insert, at least, either of the selected ideogram and emoticon into the recognition result of the recognition result output unit.

Thus, not only the recognition performance is improved, but also it is possible to make a mail automatically inserting an ideogram or an emoticon which indicates a corresponding non-language speech by using an estimate value.

Moreover, the speech recognition apparatus according to the present invention further comprises an agent control unit operable to control an agent's movement which is displayed on a screen and composite tones of an agent's speech, based on the recognition result outputted by the recognition result output unit and the estimate value estimated by the non-language speech estimation unit.

Thus, by using a recognition result and an estimate value, a response such as an agent's movement and speech can be changed depending on a non-language speech.

Furthermore, the speech recognition apparatus according to the present invention comprises a correcting parameter selection change unit operable to (i) have a user select a value of a correcting parameter for determining a degree of correction of the garbage acoustic score in the garbage acoustic score correction unit and (ii) change the selected value of the correcting parameter, wherein the garbage acoustic score correction unit corrects the garbage acoustic score, based on the correcting parameter.

Thus, by having a user select a correcting parameter, said correcting parameter can be arbitrarily set depending on the possibility of inserting a non-language.

As described above, the speech recognition apparatus according to the present invention is capable of accurately recognizing an unidentified input speech including a non-language part such as a stuttering speech, a laughing speech, and a cough.

Therefore, according to the present invention, an unidentified input speech including a non-language part can be accurately recognized. Thus, the practical value of the present invention is extremely high in this time when home appliances and cellular phones including a speech recognition function have been spreading.

Also, the present invention can not be realized only as such speech recognition apparatus as described above, but also as following: (i) a speech recognition method including steps equivalent to the characteristic units of said speech recognition apparatus, and (ii) a program which has a computer implement the steps. Needless to say, the program can be distributed via a recording medium such as a CD-ROM and a transmitting medium such as the Internet.

FURTHER INFORMATION ABOUT TECHNICAL BACKGROUND TO THIS APPLICATION

The disclosures of Japanese Patent Applications No. 2003-041129 filed on Feb. 19, 2003 and No. 2003-281625 filed on Jul. 29, 2003 respectively including specification, drawings and claims are incorporated herein by reference in its entirety.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings:

FIG. 11 shows the situation the message text with emoticons is actually displayed on the screen 901 of the cellular phone;

DETAILED DESCRIPTION OF THE INVENTION

The speech recognition apparatus according to the embodiments of the present invention will be explained using the figures as following.

First Embodiment

Figure 3:
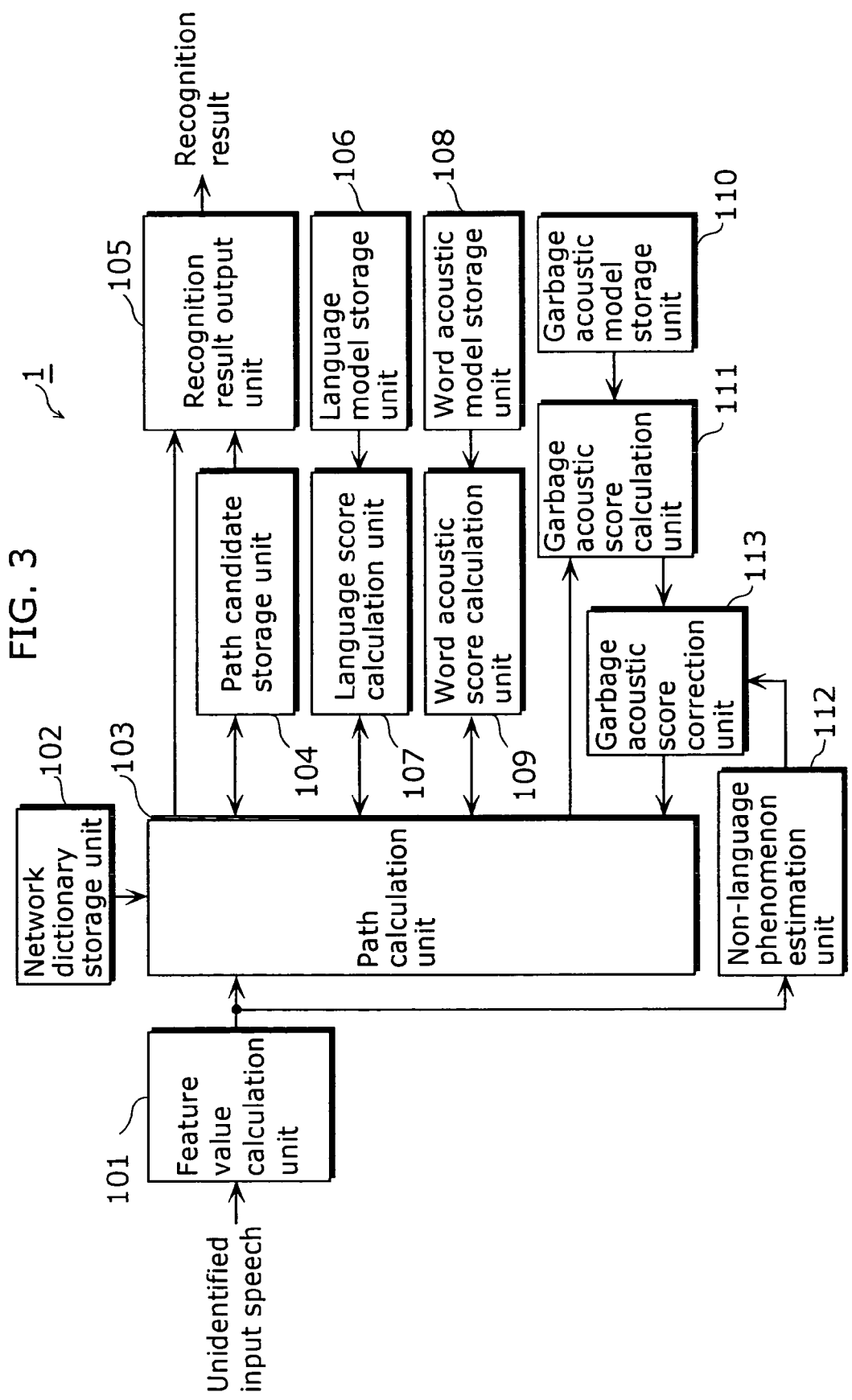
FIG. 3 is a block diagram showing the functional structure of the speech recognition apparatus according to the first embodiment of the present invention.

FIG. 3 is a block diagram showing the functional structure of the speech recognition apparatus according to the first embodiment of the present invention. The first embodiment of the present invention will be explained using the example in which the estimation subject of non-languages is stuttering speech.

The speech recognition apparatus 1 is a computer that performs a TV operation using the speech recognition function, and as shown in FIG. 3 it is equipped with: the feature value calculation unit 101, the network dictionary storage unit 102, the path calculation unit 103, the path candidate storage unit 104, the recognition result output unit 105, the language model storage unit 106, the language score calculation unit 107, the word acoustic model storage unit 108, the word acoustic score calculation unit 109, the garbage acoustic model storage unit 110, the garbage acoustic score calculation unit 111, the non-language speech estimation unit 112, and the garbage acoustic score correction unit 113.

Each unit of the speech recognition apparatus 1, except for the storage units, is operated by CPU, ROM storing the programs performed by CPU, and the memory which provides the workarea when performing a program, and temporarily stores the acoustic data of PCM signals corresponding to the inputted unidentified input speech.

The feature value calculation unit 101 analyzes the unidentified input speech, and calculates the feature parameter necessary for recognition. The network dictionary storage unit 102 stores the network dictionary wherein the list of the words that the speech recognition apparatus can accept is recorded. The path calculation unit 103 calculates the cumulative score of the path for finding the best word string of the unidentified input speech, using the record of the network dictionary. The path candidate storage unit 104 stores the cumulative score. The recognition result output unit 105 outputs the word string whose final score is the highest as the recognition result.

The language model storage unit 106 stores, in advance, the language model that has statistically learned the probability of the appearing words. The language score calculation unit 107 calculates the language score of the word that has the probability of appearing in link with the previous word. The word acoustic model storage unit 108 stores, in advance, the word acoustic model corresponding to the recognition subject vocabulary. The word acoustic score calculation unit 109 calculates the word acoustic score by comparing the feature parameter and the word acoustic model. The garbage acoustic model storage unit 110 stores the garbage acoustic model that has learned a collection of unnecessary words that do not need translation such as "Ehmm" and "Uhmm". The garbage acoustic score calculation unit 111 calculates the garbage acoustic score which is the appearing probability of the unnecessary words (the garbage model) by comparing the feature parameter and the garbage acoustic model.

The non-language speech estimation unit 112 calculates an estimate value of the non-language speech for each frame, said estimate value estimating the non-language speech. The garbage acoustic score correction unit 113 corrects the garbage acoustic score for each frame, said garbage acoustic score being calculated by the garbage acoustic score calculation unit 111.

The recognition operation of the unidentified input speech performed by each unit of the speech recognition apparatus will be explained as following.

Figure 4:
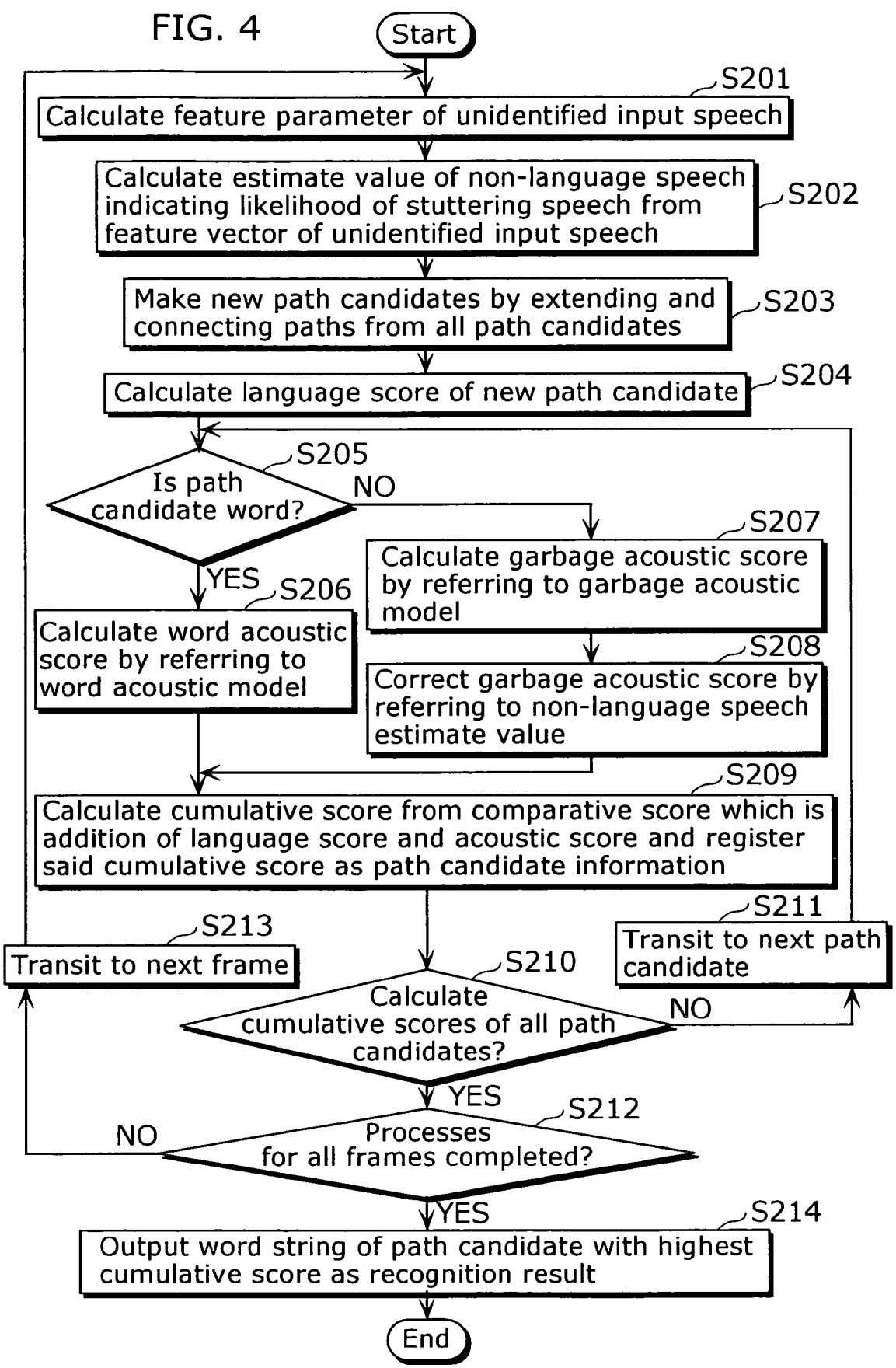
FIG. 4 is a flow chart showing the processes performed by each unit of the speech recognition apparatus 1.

FIG. 4 is a flow chart showing the processes performed by each unit of the speech recognition apparatus 1.

Each unit of the speech recognition apparatus 1 performs the following processes by forwarding the input frame from "t-1" to "t" by one frame, said frame being a time unit for speech analysis. Here, the length of a frame is 10 ms.

First, the feature value calculation unit 101 analyzes the inputted unidentified input speech, and calculates the feature parameter (S201).

Next, the non-language speech estimation unit 112 calculates the estimate value of the non-language speech (S202). According to the first embodiment of the present invention, the estimate value of the non-language speech is calculated using the repeated patterns of the spectra.

Here, the calculating method for the estimate value of the non-language speech will be further explained as following.

In the case where the feature parameter vector in the frame "t" is $X(t)$, and the Euclidean distance between the feature parameter vector $X(i)$ in the frame "i" and the feature parameter vector $X(j)$ in the frame "j" is $d(i, j)$, the distance $D(t)$ of the estimate value of the non-language speech is represented in equation (1).

In stead of the Euclidean distance, the weighted Euclidean distance can be used. In the case where the weighted Euclidean distance is used, the same effects can be acquired as the Euclidean distance.

$$D(t) = \underset{\lambda=Ns,-,Ne}{\text{Min}} \left\{ \sum_{i=1}^{\lambda} d(t+1, t-\lambda+i)/\lambda \right\} \quad (1)$$

The equation (1) represents the value of the shortest distance among the distances between the spectra patterns for the past $\lambda$ frames and the future $\lambda$ frames across the time "t" when the value of $\lambda$ is from Ns to Ne ($\lambda$ is an integer). For example, in the case Ns=3 and Ne=10, the repetition of 3 frames to 10 frames can be detected. When the spectra of the unidentified input speech takes repetitious patterns, the distance of the estimate value of the non-language speech D(t) is a low value.

The inference function for the non-language speech R(t) is represented in the equation (2) according to the first embodiment of the present invention, said non-language speech R(t) being the function that calculates the estimate value of the non-language speech in the frame "t".

$\alpha$ and $\beta$ are constant numbers. When the spectra of the unidentified input speech takes repetitious patterns, the estimate value of the non-language speech R(t) is a high value.

$$R(t) = \begin{cases} R_{\min} & (\alpha/D(t) < R_{\min}) \\ \alpha/D(t) & (R_{\min} \geq \alpha/D(t) \geq R_{\min}) \\ R_{\max} & (\alpha/D(t) > R_{\max}) \end{cases} \quad (2)$$

$(\therefore R_{\max} \geq R(t) \geq 0)$

The inference function of the non-language speech R(t) in the equation (2) can be replaced by the inference function of the non-language speech R(t) in the equation (3).

$$R(t) = \begin{cases} R_{\min} & (R_{\max} - \alpha D(t) < R_{\min}) \\ R_{\max} - \alpha D(t) & (R_{\max} - \alpha D(t) \geq R_{\min}) \end{cases} \quad (3)$$

$(\therefore R_{\max} \geq R(t) \geq R_{\min})$ $$R(t) = \begin{cases} R_{\min} & (\beta R(t-1) - \alpha D(t) < R_{\min}) \\ \beta R(t-1) - \alpha D(t) & (R_{\max} - \alpha D(t) \geq \beta R(t-1) - \alpha D(t) \geq R_{\min}) \end{cases}$$

$(\therefore R_{\max} \geq R(t) \geq R_{\min})$

Figure 5:
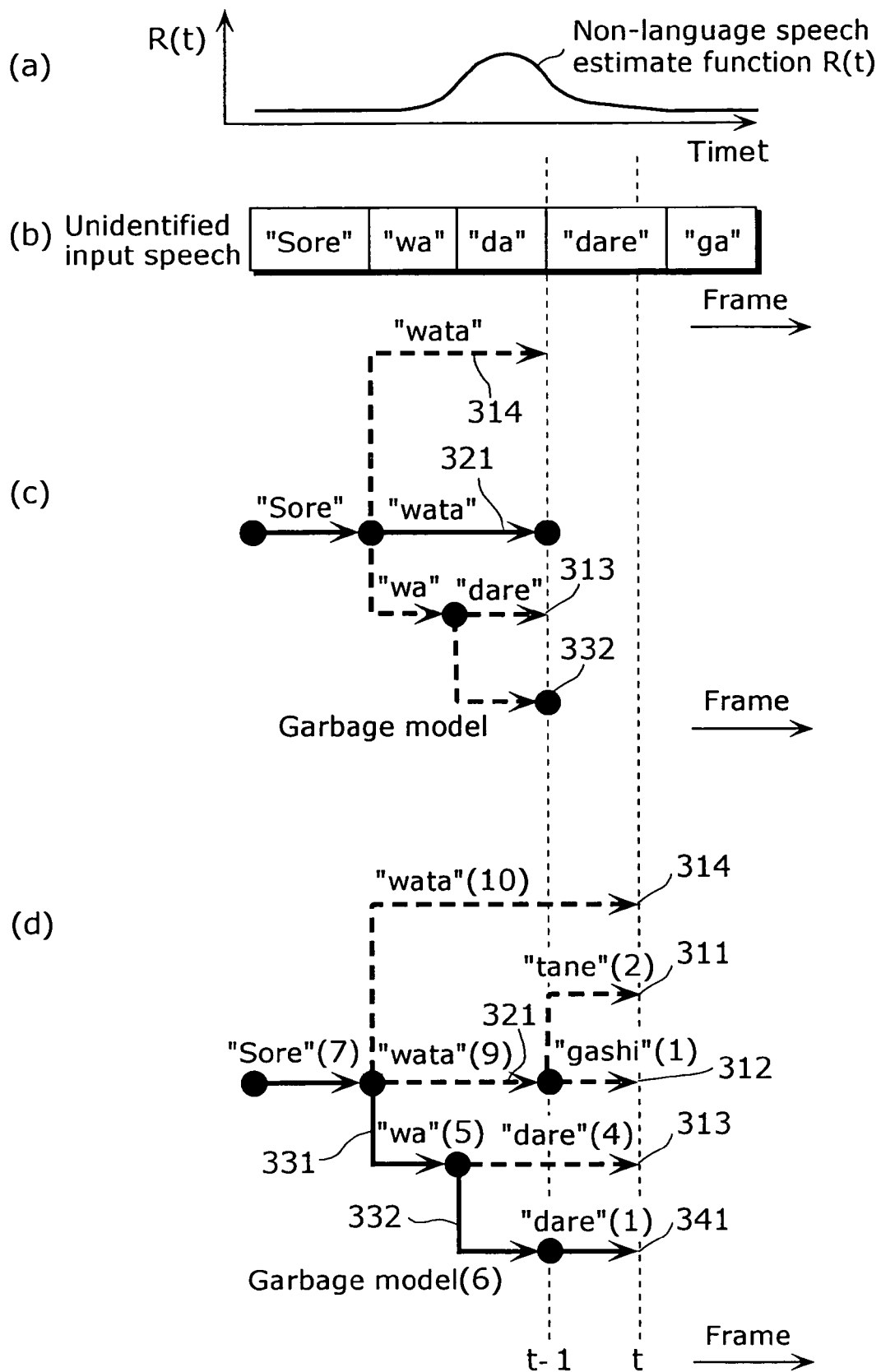
FIG. 5 shows the inference function of the non-language speech and the path candidates.

FIG. 5 shows the inference function of the non-language speech and the path candidates in the case where the unidentified input speech is "Sore wa da, dare". In particular, FIG. 5(*a*) shows an example of the inference function of the non-language speech.

In FIG. 5(*a*) the vertical axis shows the estimate value of the non-language speech, and the horizontal axis shows the frames. FIG. 5(*b*) shows the words separation of the unidentified input speech. As FIG. 5(*a*) and FIG. 5(*b*) show, the inference function of the non-language speech R(t) has a high value in the frame of the stuttering speech, "da".

The path calculation unit 103 extends a path from the path candidate in the previous frame, referring to the network dictionary stored in the network dictionary storage unit 102. The path calculation unit 103 finds the connectable word or garbage model to the path whose word ends in the previous frame, referring to the network dictionary, thereby makes a new path which connects all of the connectable words or garbage models (S203). The path calculation unit 103 extends the word of the path from the previous frame, said path being in the middle of the word.

FIG. 5(*c*) shows the path candidates in the frame "t-1" in the case where the input speech is "Sore wa da, dare". FIG. 5(*d*) shows the path candidates in the frame "t" in the case where the input speech is "Sore wa da, dare".

Here, the paths 311, 312, 313 and 314 are the non-optimum paths to some midpoint of the words. The path 321 is the non-optimum path that has reached the end of the word. The paths 331 and 332 are the optimum paths that have reached the end of the words. The path 341 is the optimum path to the end of the word.

For example, in FIG. 5(*d*) "wata" in the path 321 is connected to "tane" in the path 311 and "gashi" in the path 312. Also, "garbage model" in the path 332 is connected to "dare" in the path 341. In other paths the words are further extended.

The language score calculation unit 107 calculates the language score of the new path candidate which has been stretched or connected by referring to the language model stored in the language model storage unit 106, thereby outputs the language score to the path calculation unit 103 (S204).

Here, as the language score, the logarithm value of the bigram probability is used, said bigram probability being the probability of the words that connect to the previous words. For example, in FIG. 5(*d*), in the path wherein "dare" in the path 313 is connected to "wa" in the path 331, the appearance probability of "dare" appearing after "wa" is used. The language score is calculated per one word.

The path calculation unit 103 judges whether or not the path candidate in the corresponding frame is a word (S205). In other words, the path calculation unit 103 judges whether the path candidate in the corresponding frame is a word or a garbage model.

As a result of judging, if the path candidate is a word, the below mentioned step S206 is performed. If the path candidate is a garbage model, the below-mentioned steps S207 and S208 are performed.

For example, in FIG. 5(c), in the frame "t-1" the step S206 is performed upon "wata" in the path 314, "wata" in the path 321 and "dare" in the path 313. On the other hand, S207 and S208 are performed upon "garbage model" in the path 332.

In S205 in the case where the path calculation unit 103 judges the path as a word, the word acoustic score calculation unit 109 calculates the word acoustic score of the corresponding path candidate by referring to the word acoustic model (S206).

On the other hand, in the step S205, in the case where the path calculation unit 103 judges the path a garbage, the garbage acoustic score calculation unit 111 calculates the garbage acoustic score of the corresponding path candidate by referring to the garbage acoustic model (S207).

Next, the garbage acoustic score correction unit 113 calculates the new garbage acoustic score by referring to the inference function of the non-language speech and correcting the garbage acoustic score calculated in the step S207 (S208).

Here, the calculating method of the new garbage acoustic score will be further explained as following.

In the frame "t", in the case where the feature parameter vector is X (t) and the garbage acoustic score acquired in comparison to the garbage acoustic model is G (t), according to the first embodiment, the garbage acoustic score correction unit 113 corrects the garbage acoustic score G (t) calculated by the garbage acoustic score calculation unit 111 as shown in the equation (4), and makes the new garbage acoustic score after correction G*(t). "w" is a weighted constant number (correcting parameter).

$$G^*(t) = G(t) + wR(t) \quad (4)$$

Consequently, for example, the garbage acoustic score that was 2 points is corrected to 6 points according to the first embodiment.

In the parts where the spectra are temporally repeated, in the case where the garbage acoustic score is a rising function, any function except for the equation (4) can be used.

The word acoustic model and the garbage acoustic model use the Markov model (HMM) as well as the conventional example. The word acoustic score and the garbage acoustic score are the logarithm values of the probability acquired from HMM, and show the appearance probability of the word and garbage model.

The path calculation unit 103 adds the language score of the corresponding path candidate, the word acoustic score and the garbage acoustic score, and calculates the comparative score of the corresponding path candidate. In addition, the path calculation unit 103 (i) calculates the path of the corresponding path candidate up to the present frame by the Viterbi algorithm, (ii) calculates the cumulative score from the comparative scores of all the paths and (iii) registers the cumulative score as the path candidate information in the path candidate storage unit 104 (S209).

Here, it is not preferable to simply calculate and register all of the extended path candidates because it causes the calculation volume and memory volume to increase. Therefore, a beam search, which leaves only "K" ("K" is a natural number) extended path candidates in the order of the high cumulative score for each frame, is used. The information of the "K" path candidates is registered in the path candidate storage unit 104.

Next, the path calculation unit 103 judges whether or not the cumulative scores of all the path candidates are calculated (S210). As a result of the judgment, in the case where the cumulative scores of all the path candidates are not completely calculated (S210 is NO), the step S211 is conducted; in the case where the cumulative scores of all the path candidates are completely calculated (S210 is YES), the step S212 is conducted.

In the case where the calculation of the cumulative scores of all the path candidates is not completely calculated (S210 is NO), (i) the calculation is shifted to the next path candidate at the step S211, (ii) the procedures from the step S205 to the step S210 are repeated, and (iii) the cumulative scores of all the path candidates up to the corresponding frame are calculated.

In the case where the cumulative scores of all the path candidates are completely calculated (S210 is YES), the path calculation unit 103 judges whether or not the procedures are completed in all the frames (S212). As a result of the judgment, if the procedures are not complete in all the frames (S212 is NO), the step S213 is conducted; if the procedures are complete in all the frames (S212 is YES), the step S214 is conducted.

If the procedures are not complete in all the frames (S212 is NO), (i) the calculation is shifted to the next frame at the step S213, (ii) the procedures are repeated from the step S201 to the step S210, and (iii) the procedures up to the last frame are conducted.

If the procedures in all the frames are complete (S212 is YES), the recognition result output unit 105 outputs the word string of the path candidate which has the highest cumulative score as the recognition result, among the path candidates stored in the path candidate storage unit 104 (S214).

Figure 1:
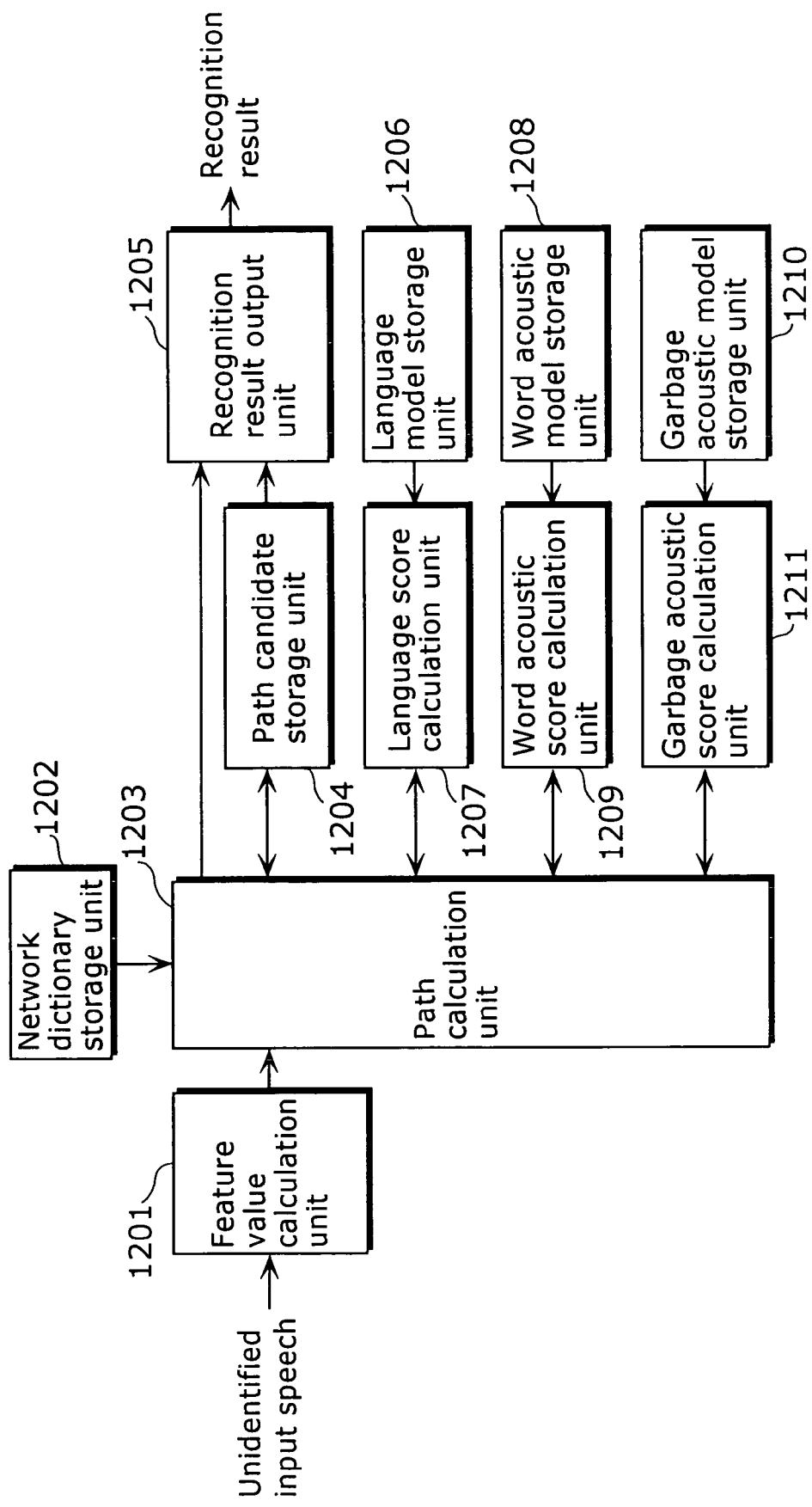
FIG. 1 shows a structure of the conventional speech recognition apparatus.
Figure 2:
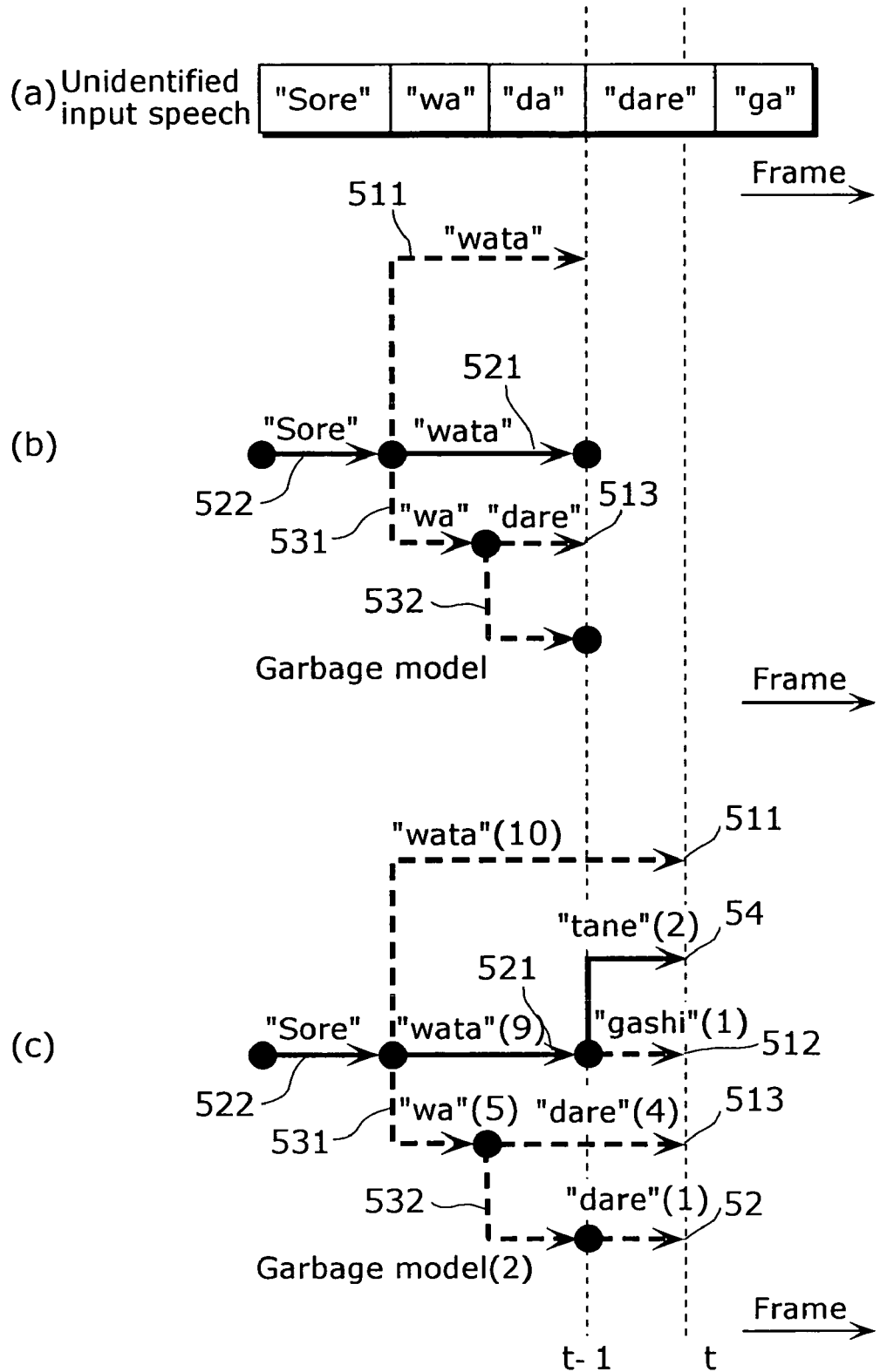
FIG. 2 shows the path candidates in the case where the input speech is "Sore wa da, dare"

As a result, conventionally, as FIG. 2(c) shows, in the case of "sore"+"wata", 7+10=17 points; in the case of "sore"+"wata"+"tane", 7+9+2=18 points; in the case of "sore"+"wata"+"gashi", 7+9+1=17 points; in the case of "sore"+"wa"+"dare", 7+5+4=16 points; in the case of "sore"+"wa"+the garbage model+"dare", 7+5+2+1=15 points; therefore, "sore"+"wata"+"tane" had the highest score in the corresponding frame.

On the other hand, according to the speech recognition apparatus 1 of the first embodiment, as FIG. 5(d) shows, in the case of "sore"+"wata", 7+10=17 points; in the case of "sore"+"wata"+"tane", 7+9+2=18 points; in the case of "sore"+"wata"+"gashi", 7+9+1=17 points; in the case of "sore"+"wa"+"dare", 7+5+4=16 points; in the case of "sore"+"wa"+the garbage model+"dare", 7+5+6+1=19 points; therefore, "sore"+"wa"+the garbage model+"dare" has the highest score up to the corresponding frame "t".

As described above, according to the speech recognition apparatus of the first embodiment, by applying the non-language speech estimate function, the garbage acoustic scores are not uniformly boosted; however, only the garbage acoustic score of the stuttering part which is non-language speech is made high, thereby the unidentified input speech is correctly recognized.

Thus, for example, in the case where a TV is operated using the speech recognition, even if the user stutters with nervousness, the speech is correctly recognized. Therefore, the user's labor and mental strain will be alleviated.

Also, the word acoustic model can link each acoustic model of the units of the phoneme, the syllable, and the subword of CV and VC.

Moreover, although the non-language speech is estimated by detecting the pattern in which the spectra are repeated according to the first embodiment, other methods for estimation can be used.

Second Embodiment

Next, the speech recognition apparatus according to the second embodiment will be explained as following.

Figure 6:
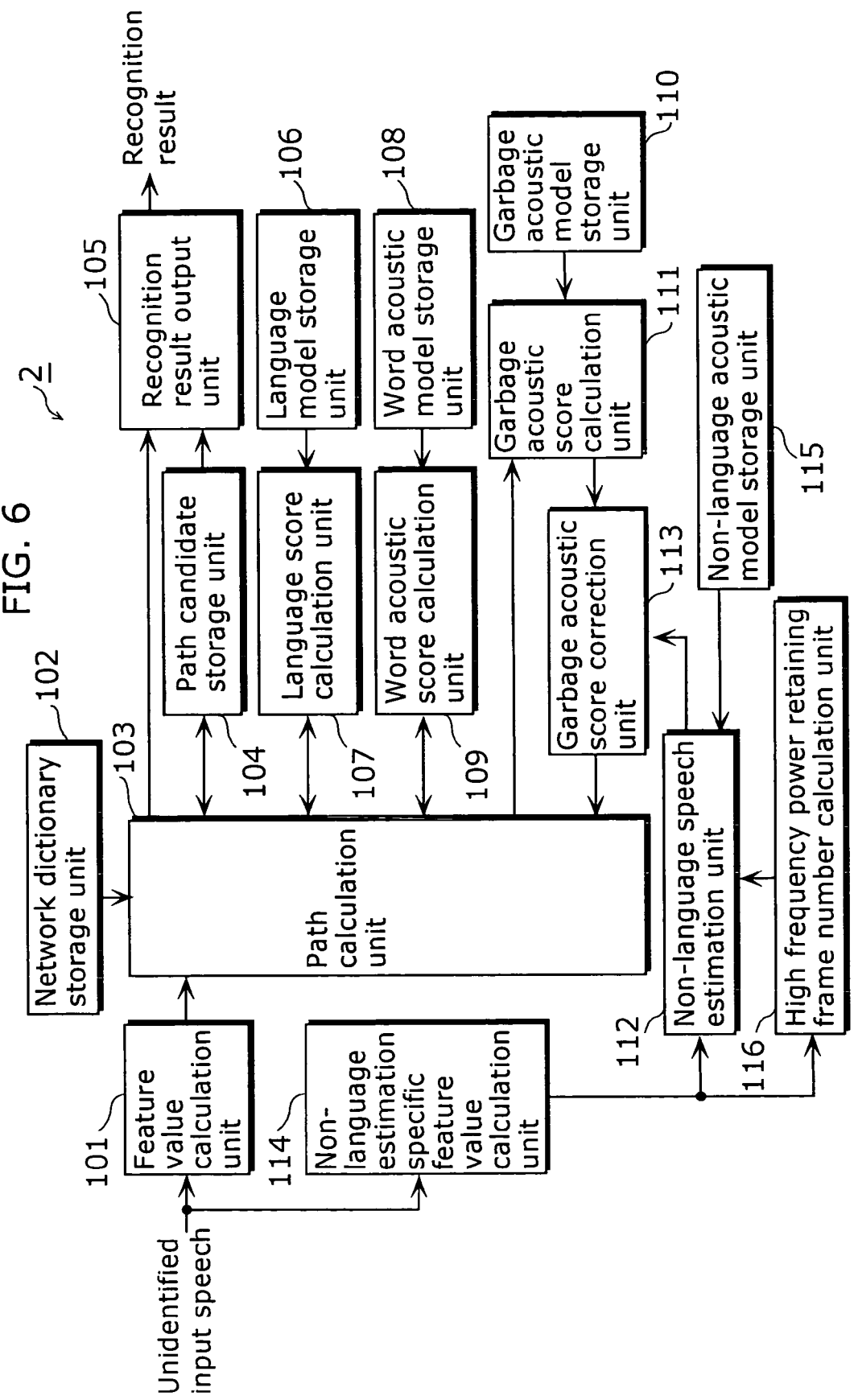
FIG. 6 is a block diagram showing the functional structure of the speech recognition apparatus according to the second embodiment of the present invention.

FIG. 6 is a block diagram showing the functional structure of the speech recognition apparatus according to the second embodiment. In this second embodiment, the case in which the subject for estimating the non-language speech is a laughing voice will be used as an example. Also, the same numbers will be used for the corresponding units of the speech recognition apparatus 1 of the first embodiment; thus, the detailed explanations will be omitted.

The speech recognition apparatus 2 is a computerized equipment which operates a TV using the speech recognition apparatus as well as the speech recognition apparatus 1. As FIG. 6 shows, the speech recognition apparatus 2 is equipped with the feature value calculation unit 101, the network dictionary storage unit 102, the path calculation unit 103, the path candidate storage unit 104, the recognition result output unit 105, the language model storage unit 106, the language score calculation unit 107, the word acoustic model storage unit 108, the word acoustic score calculation unit 109, the garbage acoustic model storage unit 110, the garbage acoustic score calculation unit 111, the non-language speech estimation unit 112, and the garbage acoustic score correction unit 113, in addition, the non-language estimation specific feature value calculation unit 114, the non-language acoustic model storage unit 115, and the high frequency power retaining frame number calculation unit 116.

Also, each unit of the speech recognition apparatus 2 is operated as well as the speech recognition apparatus 1, except for the storage unit, by (i) CPU, (ii) ROM which stores the programs conducted by CPU, and (iii) the memory which provides the workarea in conducting the programs and temporarily stores the acoustic data of the PCM signal corresponding to the inputted unidentified input speech.

The non-language estimation specific feature value calculation unit 114 acoustically analyzes the inputted unidentified input speech, and calculates, per frame, the feature parameter and the high frequency power which are necessary for comparing with the non-language acoustic model. The non-language acoustic model storage unit 115 stores, in advance, the non-language acoustic model which is the acoustic model of the non-languages such as a laughing speech.

In addition, the high frequency power retaining frame number calculation unit 116 counts the number of the frames as to how many frames with the high "high power" continue in a row. The non-language speech estimation unit 112 calculates the non-language speech estimating function which is the likelihood to be the non-language, per frame, by using (i) the feature parameter for estimating the non-language of the inputted speech, (ii) the comparative score of the non-language acoustic model, and (iii) the number of the retaining frames of the high part of the high frequency power. The garbage acoustic score correction unit 113 corrects, per frame, the garbage acoustic score which is calculated by the garbage acoustic score calculation unit 111, by using the non-language speech estimating function.

Next, the recognizing operation of the unidentified input speech by each unit of the speech recognition apparatus 2 will be explained, using FIG. 7.

Figure 7:
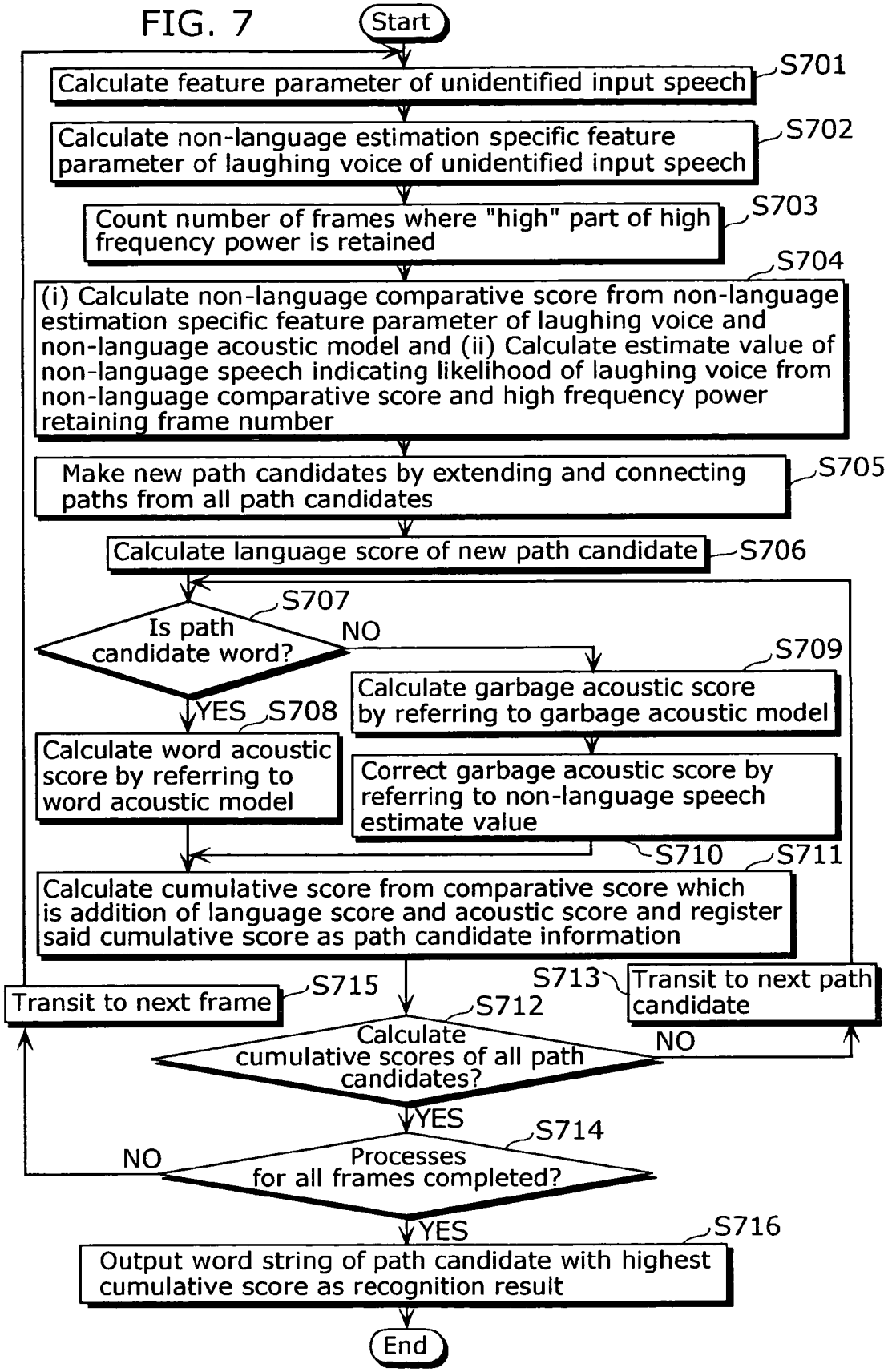
FIG. 7 is a flow chart showing the processes performed by each unit of the speech recognition apparatus 2.

FIG. 7 is a flow chart showing the procedures conducted by each unit of the speech recognition apparatus 2.

Each unit of the speech recognition apparatus 2, per frame, advancing the input frame "t" from 1 to T, by one frame, conducts the following procedures from the step S701 to the step S714. Here, the frame length is 10 ms.

First, the feature value calculation unit 101 acoustically analyzes the inputted unidentified input speech, and calculates the feature parameter (S701). Here, as the feature parameter, Mel filterbank cepstral coefficient (MFCC), the regression coefficient, and the speech power gap are used.

Next, in the case where the high frequency power acquired in the feature value calculation unit for estimating the spectral non-language 114 is higher than the already specified threshold value θ, the high frequency power retaining frame number calculation unit 116 (i) regards the corresponding frame as the frame with high "high frequency power", (ii) increments the high frequency power retaining frame number, Nhp, and (iii) clears the high frequency power retaining frame number, Nhp, to "0" at the point the high frequency power becomes lower than the threshold value θ. Thus, the high frequency power retaining frame number calculation unit 116 counts the number of frames in which the high part of the high frequency power is retained (S703).

Next, the non-language speech estimation unit 112 calculates the non-language estimating function value that indicates the likelihood to be a laughing voice by comparing the feature parameter for estimating the non-language and the non-language acoustic model. In other words, the non-language speech estimation unit 112 calculates (i) the non-language comparative score from the feature parameter for estimating the non-language and the non-language acoustic model, and (ii) the estimate value of the non-language speech which indicates the likelihood to be a laughing voice from the non-language comparative score and the high frequency power retaining frame number (S704). The method will be further explained as following.

First, the non-language speech estimation unit 112 compares, per frame, the feature parameter for estimating the non-language and the non-language acoustic model stored in the non-language acoustic model storage unit 115. The non-language acoustic model is stored in the non-language acoustic model storage unit 115 after learning ample speech data of a laughing voice in advance.

As for the feature parameter of the non-language acoustic model, the different kind from the one for the word acoustic model, such as a pitch frequency, a speech a II frequency power, a high frequency power, and a low frequency power is used. Otherwise, the same feature parameter (MFCC) as the one for the word acoustic model or both kinds can be used. Also, the parameter of the speech in the past "N" frame such as (a) the maximum power, (b) the minimum power, (c) the gap between the maximum power and the minimum power, (d) the minimum pitch frequency, (e) the maximum pitch frequency, and (f) the gap between the minimum pitch frequency and the maximum pitch frequency can be used.

The feature parameter vector is constituted by the feature parameter of the corresponding frame or the plural frames including the corresponding frame, and is made the feature parameter vector for estimating the non-language in order to compare with the non-language acoustic model.

As for the non-language acoustic model, the followings can be used: the Hidden Markov Model (HMM), the Gausian Mixture Model (GMM), the Bayesian Network (BN), the Graphical Model (GM), and the Newral Network (NN). In the second embodiment of the present invention, the GMM is used.

The score for the laughing voice in the input frame "t" which is acquired by comparing with the non-language acoustic model is made the non-language comparative score S(t). The more likely the speech is a laughing voice, the higher value the non-language comparative score S(t) has, ranging from the positive number, "0", and the negative number. The equation (5) represents the non-language speech estimate function R (t) for a laughing voice. Here, α, λ, Rmin, and Rmax are constants, and are specified as such a value as makes the recognition rate high in the recognition experiment.

$$R(t) = \begin{cases} R_{\min} & (Nhp < \lambda) \\ R_{\min} & (Nhp \geq \lambda \text{ and } \alpha S(t) < R_{\min}) \\ \alpha S(t) & (Nhp \geq \lambda \text{ and } R_{\max} \geq \alpha S(t) \geq R_{\min}) \\ R_{\max} & (Nhp \geq \lambda \text{ and } \alpha S(t) < R_{\max}) \end{cases} \quad (5)$$

$$(\therefore R_{\max} \geq R(t) \geq R_{\min})$$

Thus, when there is a laughing voice, the value of the non-language speech estimate function R(t) becomes high.

Because the procedures of the step S705 to the step S716 are the same as the step S203 to the step S214 of the first embodiment, the explanation will be omitted here.

As described above, according to the speech recognition apparatus 2 of the second embodiment, by applying the non-language speech estimate function, the garbage acoustic scores are not uniformly boosted, but only the garbage acoustic score of the laughing voice can be made high; thereby the unidentified input speech can be correctly recognized.

Also, the word acoustic model can link each acoustic model of the units of the phoneme, the syllable, and the subword of CV and VC as well as the first embodiment. In addition, if the garbage acoustic model learns not only the unnecessary speech such as "Ehmm" and "Uhmm", but also the non-language speech including a laughing voice, coughing, and a bursting speech, the recognition accuracy will be improved.

Therefore, for example, in the case where a TV is operated by the speech recognition, even if the user speaks while laughing, the speech is correctly recognized; thereby the user's labor and mental strain can be alleviated.

Although the laughing voice estimate function is calculated by using both the comparative score with the non-language acoustic model and the high frequency power retaining frame number in the second embodiment, only one of them can be used as well.

Furthermore, although the laughing voice was used as the non-language speech in the second embodiment, coughing can be recognized in the same manner.

Third Embodiment

Next, the speech recognition apparatus according to the third embodiment of the present invention will be explained.

Figure 8:
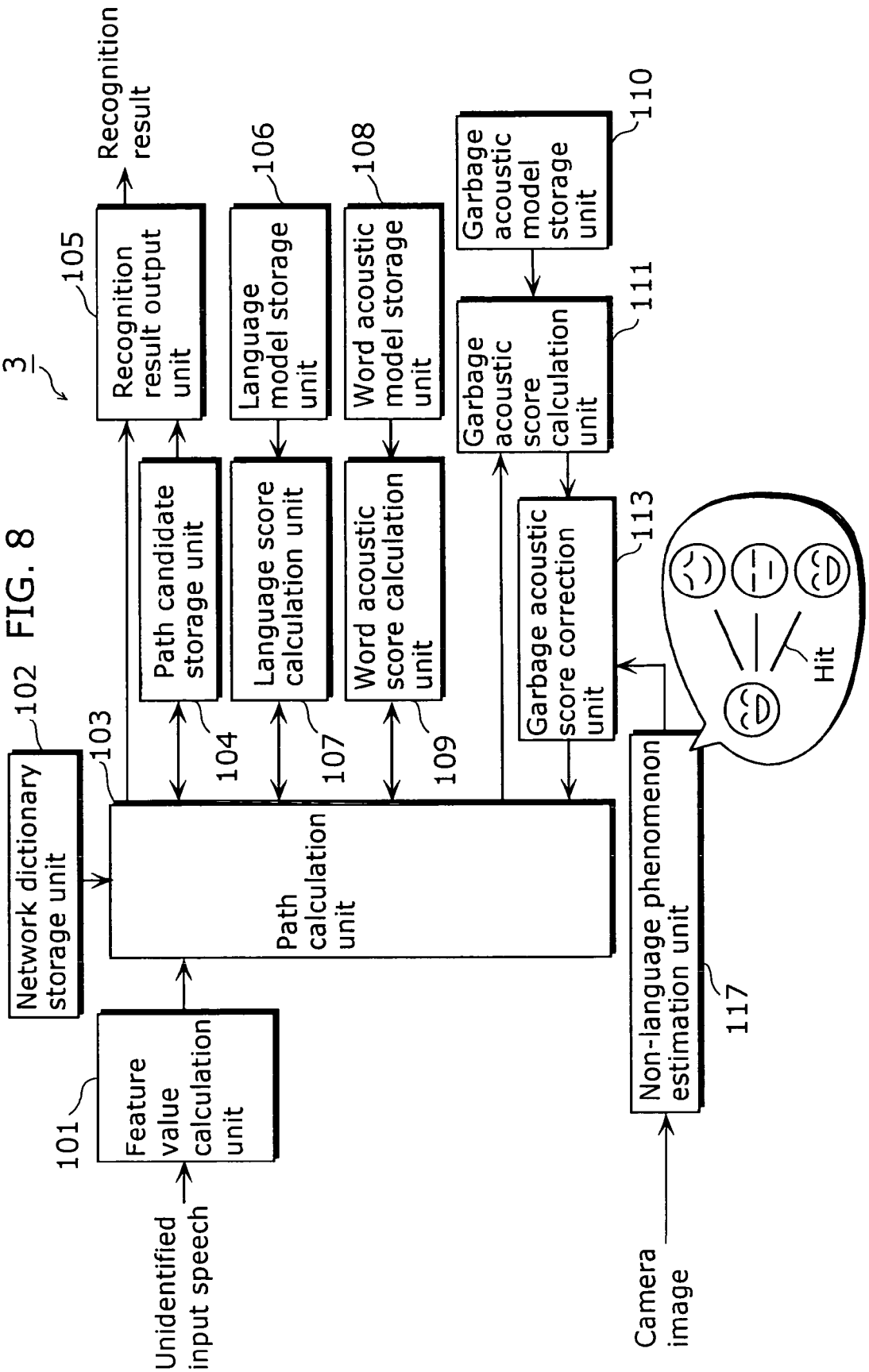
FIG. 8 is a block diagram showing the functional structure of the speech recognition apparatus according to the third embodiment of the present invention.
Figure 9:
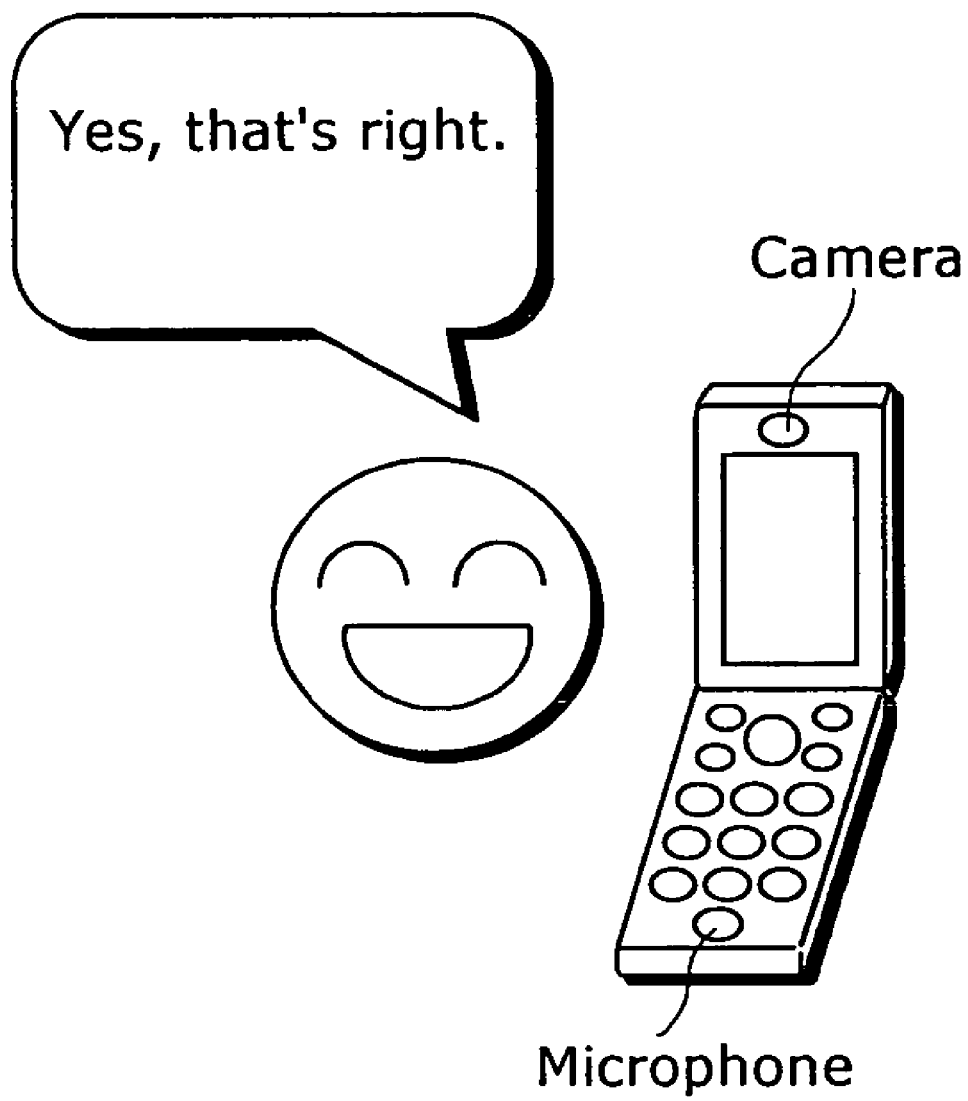
FIG. 9 shows the situation a user is inputting a message by speaking to the cellular phone comprising a camera.

FIG. 8 is a block diagram showing the functional structure of the speech recognition apparatus according to the third embodiment of the present invention. FIG. 9 shows the situation in which the user is inputting a message toward the cellular phone equipped with a camera. The third embodiment will be explained referring to an example of the case in which the cellular phone equipped with a camera detects a laughing voice or coughing from the inputted image, and corrects the garbage acoustic score of the speech recognition. Also, each unit corresponding to that of the speech recognition apparatus 1 of the first embodiment is numbered the same, and the explanation will be omitted.

The speech recognition apparatus 3 is a computerized equipment such as the cellular phone which makes a message using the speech recognition. As FIG. 8 shows, the speech recognition apparatus 3 is equipped with the feature value calculation unit 101, the network dictionary storage unit 102, the path calculation unit 103, the path candidate storage unit 104, the recognition result output unit 105, the language model storage unit 106, the language score calculation unit 107, the word acoustic model storage unit 108, the word acoustic score calculation unit 109, the garbage acoustic model storage unit 110, the garbage acoustic score calculation unit 111, the garbage acoustic score correction unit 113, and the non-language phenomenon estimation unit 117 replacing the non-language speech estimation unit 112.

Also, each unit of the speech recognition apparatus 3 is realized as well as the speech recognition apparatus 1, except for the storage unit, by (i) CPU, (ii) ROM which stores the programs conducted by CPU, and (iii) the memory which provides the workarea in conducting the programs and temporarily stores the acoustic data of the PCM signal corresponding to the inputted unidentified input speech.

The non-language phenomenon estimation unit 117 (i) detects a laughing face by using the inputted image of the camera which simultaneously films the user's face, and (ii) calculates the non-language phenomenon estimate function R (t) which indicates "the likelihood of laughing". In order to detect a laughing face, any existing equation can be used. The higher the non-language phenomenon estimate function R(t), the more "likelihood of laughing" is indicated.

For example, (i) the edge information showing the contour of each organ such as an eye, a nose, and a mouth is extracted from the face image of the camera input, (ii) the shapes and the physical relationships are used as the feature parameter, and (iii) laughing is detected by comparing with the laughing face model. Also, not only the laughing face but also the coughing image can be detected, and the non-language phenomenon estimate function can indicate "the likelihood of coughing".

In addition, as well as the first and second embodiments, the non-language phenomenon estimate function R(t) can be calculated by the equation (2) to the equation (5).

Moreover, by combining with either one of the first and second embodiments, the weighted addition of (a) the non-language speech estimate function according to the speech and (b) the non-language phenomenon estimate function according to the image can be used to form a new non-language phenomenon estimate function.

Furthermore, not only the camera image information but also the organism information such as brain wave, blood pressure, heart rate, perspiration, and the facial temperature can be used as input by attaching the organism information censor to the speech recognition apparatus.

For example, the non-language phenomenon estimate function R(t) indicating "the likelihood of laughing" can be calculated by comparing (a) the time string pattern of the brain wave inputted by the brain wave measuring apparatus and (b) the laughing brain wave model indicating the laughing situation. Also, more accurate non-language phenomenon can be estimated by not only using the brain wave as the input feature value but also combining (a) the time string pattern of the voltage detected from the voltage censor of the blood pressure gauge indicating the blood pressure and heart rate, (b) humidity censor indicating the amount of perspiration and the facial temperature, and (c) the time string pattern of the electric current detected from the temperature censor.

Although the speech recognition apparatus 3 according to the third embodiment was utilized for the cellular phone, it can also be used for a computer, a car navigation system, a TV, and other home electric appliances.

As described above, for example, when inputting a message to the cellular phone equipped with a camera, by using a facial image, even in the place with the noisy environment, (i) the laughing face can be accurately detected in synchronization with the laughing voice, (ii) the garbage acoustic score can be corrected to the high value, and (iii) the speech recognition performance can be improved. Also, in the case of coughing, as well as the laughing speech, the speech recognition performance can be improved.

Fourth Embodiment

Next, the speech recognition apparatus according to the fourth embodiment will be explained.

Figure 10:
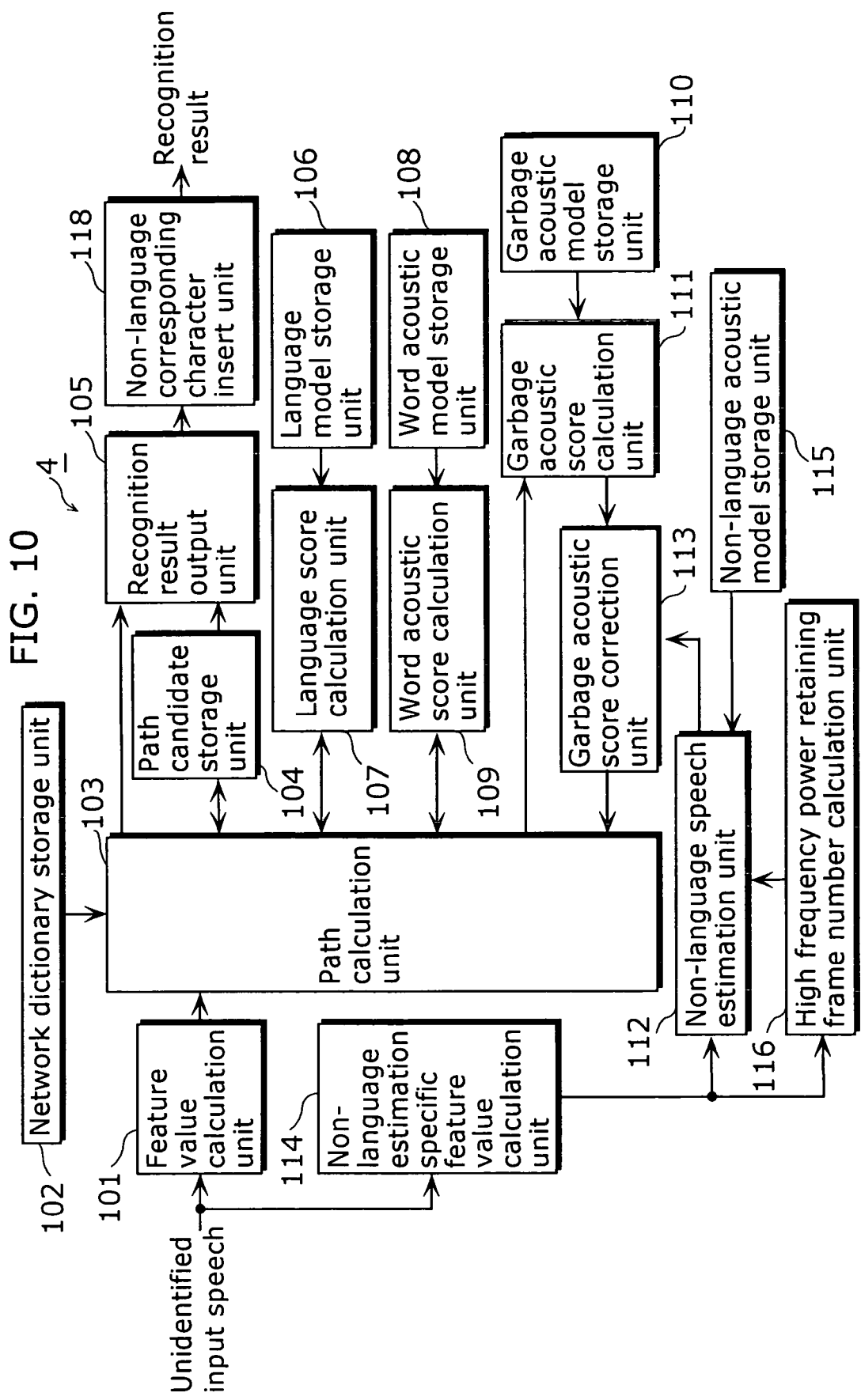
FIG. 10 is a block diagram showing the functional structure of the speech recognition apparatus 4 according to the fourth embodiment of the present invention.
Figure 11:
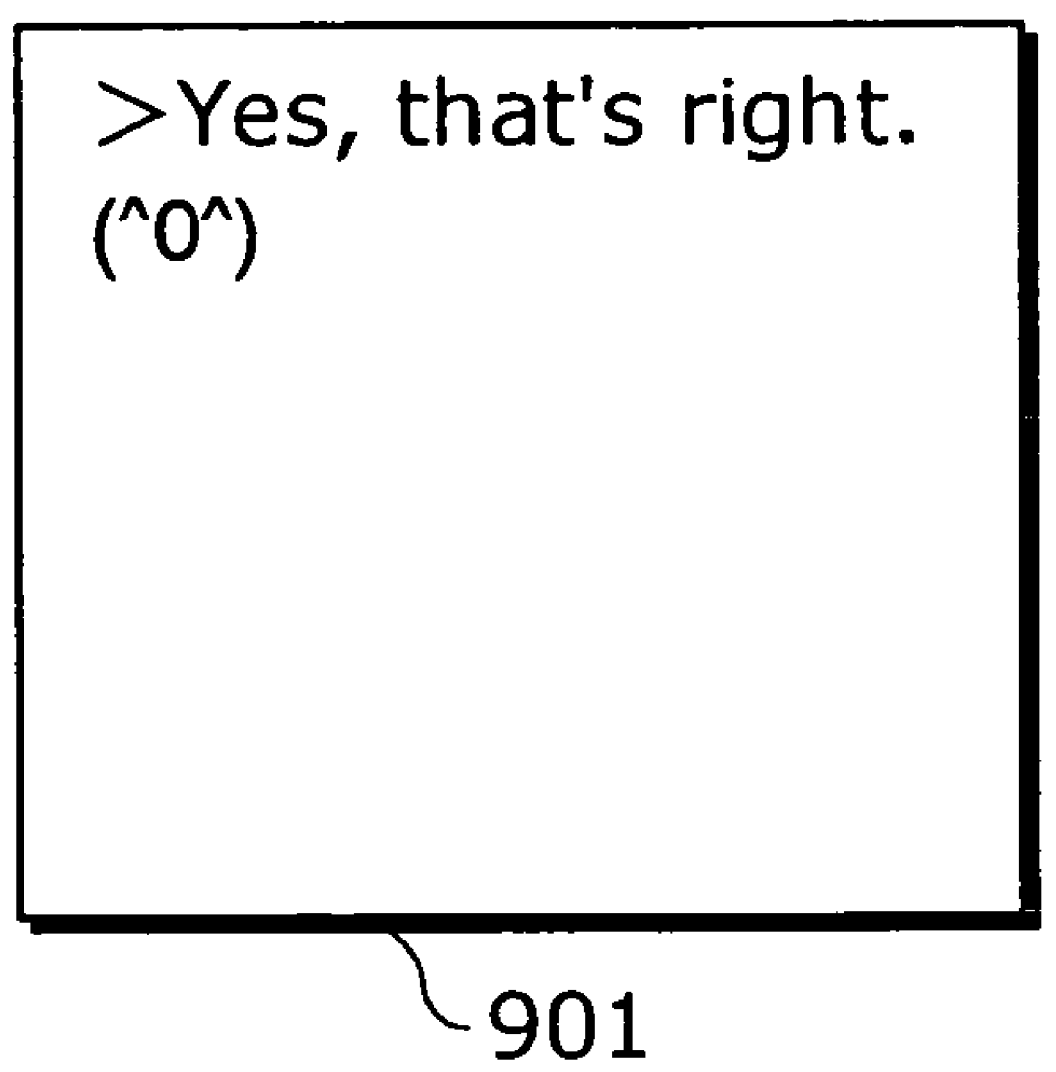

FIG. 10 is a block diagram showing the functional structure of the speech recognition apparatus 4 according to the fourth embodiment of the present invention. FIG. 11 shows the situation in which the text message with emoticons is actually displayed in the screen 901 of the cellular phone. In the fourth embodiment (i) in the case where the speech recognition is used as an interface for the character input into the cellular phone, (ii) if the user laughs or coughs when the speech recognition apparatus 4 recognizes the speech, and (iii) if the non-language speech estimate function for laughing or coughing exceeds the already specified threshold value, the emoticon corresponding to the kind of the non-language is displayed in the middle or in the end of the sentence. For example, as the emoticon for a smile, there is "(ˆoˆ)"; and as the emoticon for coughing, there is "ρ (>o<)". Also, each unit corresponding to the one in the speech recognition apparatus 2 of the second embodiment is numbered the same, and the explanation will be omitted.

The speech recognition apparatus 4 is a computerized equipment such as the cellular phone which makes a message using the speech recognition. As FIG. 10 shows, the speech recognition apparatus 4 is equipped with the feature value calculation unit 101, the network dictionary storage unit 102, the path calculation unit 103, the path candidate storage unit 104, the recognition result output unit 105, the language model storage unit 106, the language score calculation unit 107, the word acoustic model storage unit 108, the word acoustic score calculation unit 109, the garbage acoustic model storage unit 110, the garbage acoustic score calculation unit 111, the non-language speech estimation unit 112, and the garbage acoustic score correction unit 113, the non-language estimation specific feature value calculation unit 114, the non-language acoustic model storage unit 115, and the high frequency power retaining frame number calculation unit 116, in addition, the non-language-corresponding-character insert unit 118.

Also, each unit of the speech recognition apparatus 4 is operated as well as the speech recognition apparatus 2, except for the storage unit, by (i) CPU, (ii) ROM which stores the programs conducted by CPU, and (iii) the memory which provides the workarea in conducting the programs and temporarily stores the acoustic data of the PCM signal corresponding to the inputted unidentified input speech.

The non-language-corresponding-character insert unit 118 (i) is equipped with the emoticons and characters (ideograms) which correspond to the non-language speech such as laughing or coughing, (ii) inserts the emoticon corresponding to the kind of the non-language in the middle or in the end of the sentence in the case where the non-language speech estimate function R(t) outputted by the non-language speech estimation unit 112 exceeds the threshold value, and (iii) displays the sentence in which the emoticon is inserted as shown in FIG. 11, as the recognition result outputted by the recognition result output unit 105. Here, characters can be displayed in place of the emoticons. For example, if the user laughs, "(laugh)" can be inserted; and if the user coughs, "(cough)" can be inserted.

In addition, the user himself can set what kind of characters or emoticons should be displayed, depending on the non-language phenomenon beforehand. Also, in the middle of the character input by the speech recognition, the user can set the necessity or unnecessity of inserting the characters or emoticons according to the non-language phenomenon.

Moreover, it is possible to (i) display the smiley emoticon in the case where the value of the non-language speech estimate function R(t) is low, and (ii) display the high laughing emoticon in the case where the value of the non-language speech estimate function R(t) is high. Also, according to the number of the continuing frames in which the value of the non-language speech estimate function becomes higher than the already specified threshold value, the characters and the emoticons displayed depending on the non-language phenomenon can be changed.

For example, if the user smiles, the emoticon "(ˆoˆ)" can be displayed; if the user laughs a lot, the emoticon "(≧□≦)"can be displayed.

Furthermore, the user himself can set whether the emoticons or the characters should be displayed (a) in the middle of the sentence where the non-language phenomenon appears or (b) in the end of the sentence.

Also, it is possible to display the character or the emoticon corresponding to the kind of the non-language detected by the non-language speech estimate function R (t) without correcting the garbage acoustic score. In this case, the non-language speech estimate function is calculated by comparing the inputted speech with the non-language acoustic model such as "anger", "pleasure", and "question". If the value of the non-language speech estimate function is higher than the already specified threshold value, it is possible to display the characters corresponding to the non-language phenomenon. Moreover, as shown in the speech recognition apparatus 3 of the third embodiment, using the non-language phenomenon estimate function R(t) calculated by both the camera image and the organism information enables more accurate display. Also, the speech recognition apparatus 4 can be formed by adding the non-language corresponding character insert unit 118 to the speech recognition apparatus 1 of the first embodiment.

Here, the following displays are possible: (i) for "anger", "(anger)" or "(▼▼ˣ)", (ii) for "pleasure", "(pleasure)" or "o(^▽^)o~♪", and (iii) for "question", "(?)" or "(•_•?)".

Also, the characters and emoticons for displaying the non-language phenomenon other than the ones described above can be displayed.

Consequently, for example, when inputting a message to a cellular phone, in addition to the improved speech recognition, it is possible to insert an emoticon at the point when the user actually laughs while inputting the message. Thus, more virtual message can be written.

Fifth Embodiment

Next, the speech recognition apparatus according to the fifth embodiment will be explained.

Figure 12:
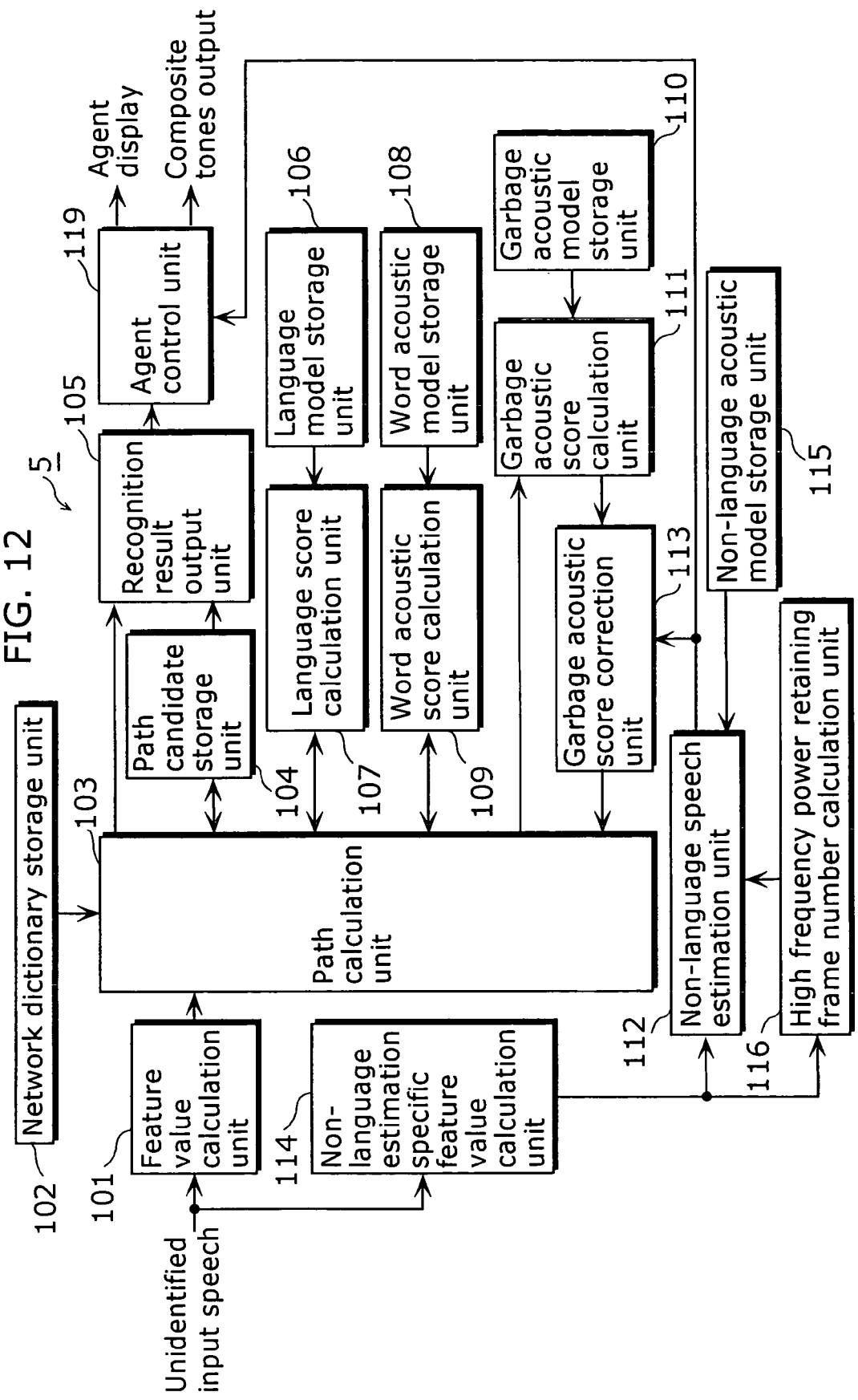
FIG. 12 is a block diagram showing the functional structure of the speech recognition apparatus according to the fifth embodiment of the present invention.

FIG. 12 is a block diagram showing the structure function of the speech recognition apparatus according to the fifth embodiment. In this fifth embodiment, in the dialogue with the agent on the computer, if a non-language speech such as a stuttering speech, a laughing speech, and a coughing is detected, the agent reacts to the kind of the non-language.

Also, each unit corresponding to the speech recognition apparatus 2 of the second embodiment is numbered the same, and the explanation will be omitted.

The speech recognition apparatus 5 is a computerized apparatus such as a computer equipped with the speech recognition function. As FIG. 12 shows, the speech recognition apparatus 5 is equipped with the feature value calculation unit 101, the network dictionary storage unit 102, the path calculation unit 103, the path candidate storage unit 104, the recognition result output unit 105, the language model storage unit 106, the language score calculation unit 107, the word acoustic model storage unit 108, the word acoustic score calculation unit 109, the garbage acoustic model storage unit 110, the garbage acoustic score calculation unit 111, the non-language speech estimation unit 112, and the garbage acoustic score correction unit 113, in addition, the non-language estimation specific feature value calculation unit 114, the non-language acoustic model storage unit 115, the high frequency power retaining frame number calculation unit 116, and the agent control unit 119.

Each unit of the speech recognition apparatus 5, except for the storage units, is operated by CPU, ROM storing the programs performed by CPU, and the memory which provides the workarea when performing a program, and temporarily stores the acoustic data of PCM signals corresponding to the inputted unidentified input speech.

The agent control unit 119 (i) is equipped with the data of the agent's images to display on the screen and the composite tones of the agent's speech, (ii) displays the agent's movement and face expressions, according to the recognition result acquired from the recognition result output unit 105 and the non-language speech estimate function acquired from the non-language speech estimation unit 112, and (iii) outputs a sentence of the composite tones corresponding to the agent.

For example, in the case where a stuttering speech is detected, the agent outputs the composite tones, "You don't have to be nervous!", and waves. Thus, the agent performs the operation to inspire relaxation. Also, in the case where a laughing voice is detected, the agent laughs along, and outputs the composite tones, "Is it that funny?" In the case where a coughing is detected, the agent outputs the composite tones, "Do you have a cold?" with a worried face.

Furthermore, in the case many laughing voices or coughs are detected, and the recognition result is not acquired, the synthetic speech such as "The recognition was not possible, due to too many laughing voices." or "The recognition was not possible, due to too many coughs." are outputted. Also, it is possible to have the agent sorrowfully apologize on the screen.

Although the dialogue was made with the agent in the computer according to the fifth embodiment, the similar displays are possible with other electronic equipments such as a TV and a cellular phone. Also, in combination with the third embodiment, by using the result of a laughing face detected from the camera image of a cellular phone, the agent can copy the action of laughing. The speech recognition apparatus 5 can also be formed by adding the agent control unit 119 to the speech recognition apparatus 1 of the first embodiment.

Although the fifth embodiment was explained using the non-language speech estimate function, the similar effects can be acquired by using either of the non-language phenomenon estimate function or the non-language speech estimate function.

Consequently, in the dialogue with the agent, in addition to the improved speech recognition, the user's tensions are alleviated, and more enjoyable conversation is possible.

Sixth Embodiment

Figure 13:
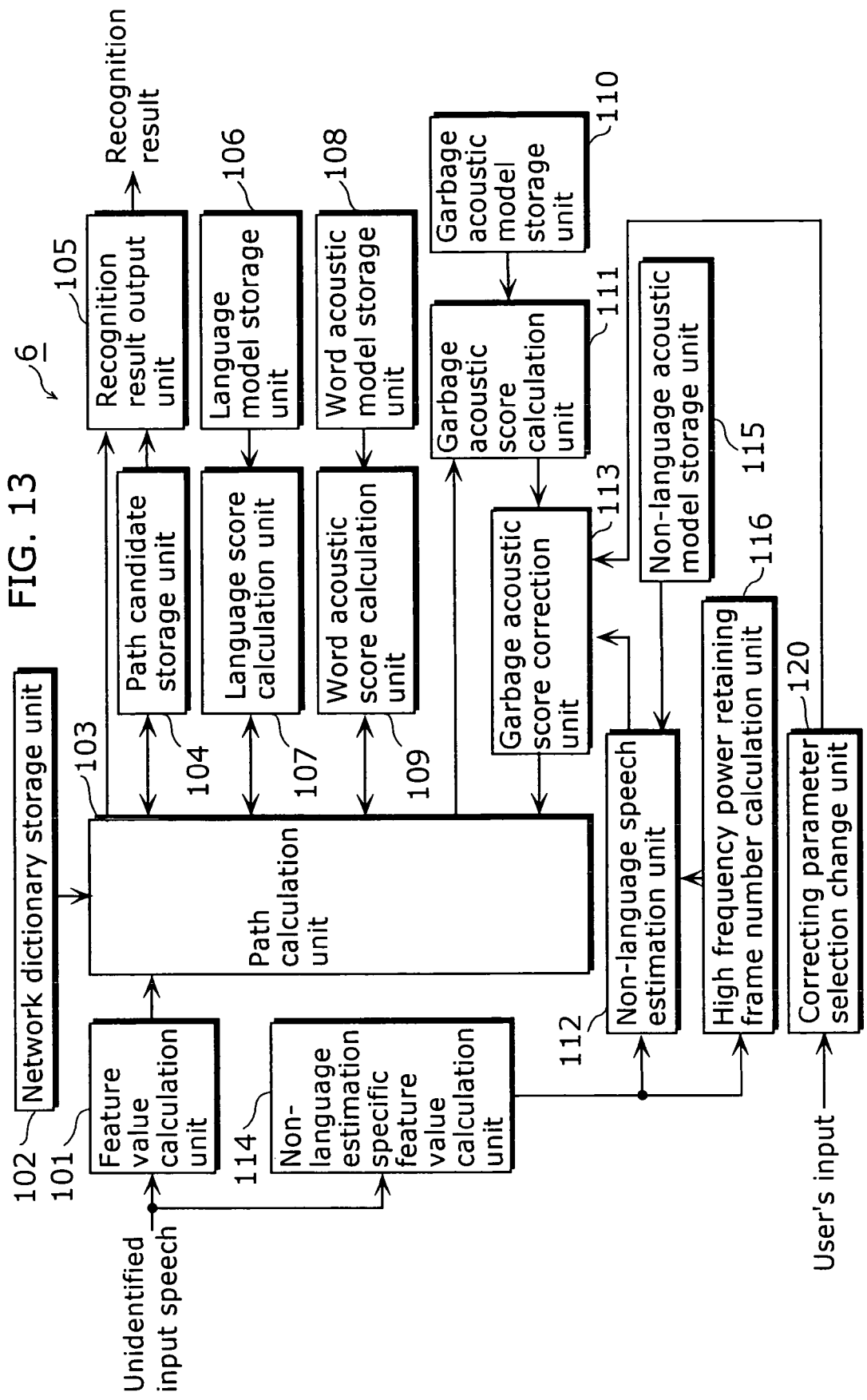
FIG. 13 is a block diagram showing the functional structure of the speech recognition apparatus according to the sixth embodiment of the present invention.

Next, the speech recognition apparatus according to the sixth embodiment will be explained. FIG. 13 is a block diagram showing the functional structure of the speech recognition apparatus according to the sixth embodiment. In this sixth embodiment, the user decides, in advance, the value of the correcting parameter "w" of the equation (4) which is used in the garbage acoustic score correction unit 113.

Here, if the value of "w" is high, the non-language part is made easy to insert as the result of the speech recognition. If the value of "w" is low, the non-language part is made difficult to insert. For example, for the user who easily utters a stuttering speech, the big degree of correction enables high quality and good ease-of-use. For the user who rarely utters a stuttering speech, the small degree of correction enables high quality and good ease of use.

In the case of orally inputting a casual text message, it is convenient (i) in the message for a friend the emoticon is easily inserted by a laughing voice, and (ii) in the message for a superior the emoticon is hardly or never inserted. Therefore, the user sets the parameter that determines the frequency of insertion of the non-language part.

Here, on the basis of the speech recognition apparatus 2, the case the user corrects the value of the correcting parameter "w" which is used in the garbage acoustic score correction unit 113 will be explained. Also, each unit corresponding to the speech recognition apparatus 2 is numbered the same, and the explanation will be omitted.

The speech recognition apparatus 6 is a computerized equipment with the speech recognition function. As FIG. 13 shows, the speech recognition apparatus 6 is equipped with: the feature value calculation unit 101, the network dictionary storage unit 102, the path calculation unit 103, the path candidate storage unit 104, the recognition result output unit 105, the language model storage unit 106, the language score calculation unit 107, the word acoustic model storage unit 108, the word acoustic score calculation unit 109, the garbage acoustic model storage unit 110, the garbage acoustic score calculation unit 111, the non-language speech estimation unit 112, and the garbage acoustic score correction unit 113, in addition, the non-language estimation specific feature value calculation unit 114, the non-language acoustic model storage unit 115, the high frequency power retaining frame number calculation unit 116, and the correcting parameter selection change unit 120.

Also, each unit of the speech recognition apparatus 6 is operated as well as the speech recognition apparatus 2, except for the storage unit, by (i) CPU, (ii) ROM which stores the programs conducted by CPU, and (iii) the memory which provides the workarea in conducting the programs and temporarily stores the acoustic data of the PCM signal corresponding to the inputted unidentified input speech.

The correcting parameter selection change unit 120 displays, on the screen, (i) the button to enlarge the degree of correction, (ii) the button to shrink the degree of correction, and (iii) the button to block the correction. The value of the parameter "w" of the equation (4) which is used by the garbage acoustic score correction unit 113 is changed, based on the user's selection.

First, the correcting parameter selection change unit 120 displays the button for the correcting parameter on the screen at the initial setting, and enables the user to select the degree of correction depending on his taste.

Thus, the frequency of inserting the non-language part of the recognition result can be set according to the user's taste.

The correcting parameter selection change unit 120 can also display slide bars in stead of buttons for the user to specify the arbitrary value. In the case where the pointing device is difficult to use because of the small screen such as a cellular phone, the correcting parameter selection changing function can be included in the number buttons and function keys.

Because the value of the garbage score fluctuates, depending on the quality of the user's voice or the way of speech, the user can set the correcting parameter of the garbage score while talking so that the speech including the non-language part can be recognized most accurately in his way of speech.

Although only the correcting parameter "w" is decided by the user in the sixth embodiment, Ns and Ne of the equation (1) and α, β, r, Rmin, and Rmax of the equations (2), (3), and (5) can also be set by the user.

In addition, the parameter can be corrected by adding the correcting parameter selection change unit 120 to the speech recognition apparatus 1, the speech recognition apparatus 3, the speech recognition apparatus 4, and the speech recognition apparatus 5.

Thus, for example, the user who easily utters a stuttering speech can improve the recognition performance by enlarging the degree of correction. Moreover, in inputting the text message, the frequency of inserting the emoticons can be modified depending on the receiver of the message such as a close friend or a superior.

This invention is realized by a program. Such program can be easily performed in the independent computer system by transferring it in the recording medium such as a flexible disk. Here, any recording medium that records the program including the optical disk, IC card, and ROM cassette can be used.

INDUSTRIAL APPLICABILITY

The speech recognition apparatus and the speech recognition method according to the present invention can correctly recognize the speech even if it is unidentified input speech including the non-language part such as a stuttering speech, a laughing voice, and a coughing. Therefore, it is useful as the speech recognition apparatus and the speech recognition method that recognize the serial word speech accepting the unnecessary words that do not need translation. Consequently, it can be applied to a TV with the speech recognition function, home electric appliances such as a microwave oven, the mobile information terminal for a cellular phone, and a computerized equipment such as a computer.

The invention claimed is:

1. A speech recognition apparatus for calculating a degree of likelihood of a non-language speech from an unidentified input speech, said speech recognition apparatus calculating, per path, a cumulative score of a language score, a word acoustic score and a garbage acoustic score and outputting a word string with a highest cumulative score as a recognition result of the unidentified input speech including a non-language speech, said apparatus comprising:
a garbage acoustic model storage unit operable to store, in advance, a garbage acoustic model which is an acoustic model learned from a collection of a plurality of unnecessary words;
a feature value calculation unit operable to calculate a feature parameter necessary for recognition by acoustically analyzing the unidentified input speech per frame which is a unit for speech analysis;
a garbage acoustic score calculation unit operable to calculate the garbage acoustic score by comparing the feature parameter and the garbage acoustic model per frame;
an estimate value calculation unit operable to calculate, per frame, an estimate value which indicates a degree of likelihood to be a non-language speech of one of the plurality of unnecessary words;
a garbage acoustic score correction unit operable to correct the garbage acoustic score calculated by said garbage acoustic score calculation unit so as to raise the score only in the frame where the non-language speech is inputted by adding the estimate value to the garbage acoustic score, the estimate value being calculated by said estimate value calculation unit, and the garbage acoustic score being calculated by said garbage acoustic score calculation unit; and
a recognition result output unit operable to output the word string as the recognition result of the unidentified input speech, the word string having the highest cumulative score of the language score, the word acoustic score, and the garbage acoustic score corrected by said garbage acoustic score correction unit.

2. The speech recognition apparatus according to claim 1, wherein said estimate value calculation unit includes a non-language speech estimation unit operable to calculate, per frame, an estimate value which indicates a degree of likelihood to be a non-language speech of one of the plurality of unnecessary words, using a non-language speech estimate function, and
said garbage acoustic score correction unit corrects the garbage acoustic score so as to raise the score by using the estimate value calculated by said non-language speech estimation unit in the frame where the non-language speech is inputted.

3. The speech recognition apparatus according to claim 2, wherein said non-language speech estimation unit calculates an estimate value which is high in a part where spectra of the unidentified input speech become repeating patterns, based on the feature parameter calculated, per frame, by said feature value calculation unit.

4. The speech recognition apparatus according to claim 2, further comprising:
a non-language estimation specific feature value calculation unit operable to calculate, per frame, the feature parameter which is necessary for estimating the non-language speech; and
a non-language acoustic model storage unit operable to store, in advance, a non-language acoustic model which is an acoustic model modeling the features of non-languages,
wherein said non-language speech estimation unit calculates, per frame, a non-language comparative score as the estimate value by comparing the feature parameter for estimating the non-language and the non-language acoustic model.

5. The speech recognition apparatus according to claim 4, further comprising a high frequency power retaining frame number calculation unit operable to calculate the number of frames that retain high frequency power based on the feature parameter for estimating the non-language which is calculated by said non-language estimation specific feature value calculation unit,
wherein said non-language speech estimation unit calculates the non-language comparative score by comparing the feature parameter for estimating the non-language and the non-language acoustic model, and calculates the estimate value which indicates the likelihood to be the non-language from the non-language comparative score and the high frequency power retaining frame number.

6. The speech recognition apparatus according to claim 5, wherein said high frequency power retaining frame number calculation unit regards the high frequency power acquired by said feature value calculation unit operable to estimate the non-language as the frame of "high" high frequency power in a case where the high frequency power is higher than a predetermined threshold value.

7. The speech recognition apparatus according to claim 2, further comprising a non-language corresponding character insert unit operable to (i) select at least one of an ideogram and an emoticon corresponding to the non-language speech based on the estimate value estimated by said non-language speech estimation unit and (ii) insert at least either of the selected ideogram and emoticon into the recognition result of said recognition result output unit.

8. The speech recognition apparatus according to claim 2, further comprising an agent control unit operable to control an agent's movement which is displayed on a screen and composite tones of an agent's speech based on the recognition result outputted by said recognition result output unit and the estimate value estimated by said non-language speech estimation unit.

9. The speech recognition apparatus according to claim 1, wherein said estimate value calculation unit includes a non-language phenomenon estimation unit operable to calculate an estimate value of a non-language phenomenon which is related to the non-language speech based on user's information interlocking the non-language speech of one of the plurality of necessary words, and said garbage acoustic score correction unit corrects the garbage acoustic score so as to raise the score using the estimate value in the frame where the non-language phenomenon which is calculated by said non-language phenomenon estimation unit is inputted.

10. The speech recognition apparatus according to claim 9, further comprising a non-language character insert unit operable to (i) select at least either of an ideogram and an emoticon corresponding to the non-language speech, based on the estimate value estimated by said non-language phenomenon estimation unit, and (ii) insert at least one of the selected ideogram and emoticon into the recognition result of said recognition result output unit.

11. The speech recognition apparatus according to claim 9, further comprising an agent control unit operable to control an agent's movement which is displayed on a screen and composite tones of an agent's speech based on the recognition result outputted by said recognition result output unit and the estimate value estimated by said non-language speech estimation unit.

12. The speech recognition apparatus according to claim 1, further comprising a correcting parameter selection change unit operable to (i) have a user select a value of a correcting parameter for determining a degree of correction of the garbage acoustic score in said garbage acoustic score correction unit and (ii) change the selected value of the correcting parameter, wherein said garbage acoustic score correction unit corrects the garbage acoustic score, based on the correcting parameter.

13. A speech recognition method used by a speech recognition apparatus for calculating a degree of likelihood of a non-language speech from an unidentified input speech, the speech recognition apparatus calculating a cumulative score of a language score, a word acoustic score, and a garbage acoustic score, per path, and outputting a word string with a highest cumulative score as a recognition result of the unidentified input speech including a non-language speech, said method comprising:

a feature value calculation step of calculating a feature parameter necessary for recognition by acoustically analyzing the unidentified input speech per frame which is a unit for speech analysis;

a garbage acoustic score calculation step of calculating the garbage acoustic score by comparing, per frame, the feature parameter and the garbage acoustic model which is stored in the garbage acoustic model storage unit and which is an acoustic model learned from a collection of unnecessary words;

an estimate value calculation step of calculating, per frame, an estimate value which indicates a degree of likelihood to be a non-language speech of one of the plurality of unnecessary words;

a garbage acoustic score correction step of correcting the garbage acoustic score calculated by the garbage acoustic score calculation step so as to raise the score only in the frame where the non-language speech is inputted by adding the estimate value to the garbage acoustic score, the estimate value being calculated in the estimate value calculation step, and the garbage acoustic score being calculated in the garbage acoustic score calculation step; and a recognition result output step of outputting, as the recognition result of the unidentified input speech, the word string with the highest cumulative score of the language score, the word acoustic score and the garbage acoustic score which is corrected by the garbage acoustic score correction step.

14. A program stored on a computer-readable medium for a speech recognition apparatus for calculating a degree of likelihood of a non-language speech from an unidentified input speech, the speech recognition apparatus calculating a cumulative score of a language score, a word acoustic score, and a garbage acoustic score, per path, and outputting a word string with a highest cumulative score as a recognition result of the unidentified input speech including a non-language speech, said program causing a computer to execute:

a feature value calculation step of calculating a feature parameter necessary for recognition by acoustically analyzing the unidentified input speech per frame which is a unit for speech analysis;

a garbage acoustic score calculation step of calculating the garbage acoustic score by comparing, per frame, the feature parameter and the garbage acoustic model which is stored in the garbage acoustic model storage unit and which is an acoustic model learned from a collection of unnecessary words;

an estimate value calculation step of calculating, per frame, an estimate value which indicates a degree of likelihood to be a non-language speech of one or the plurality of unnecessary words;

a garbage acoustic score correction step of correcting the garbage acoustic score calculated by the garbage acoustic score calculation step so as to raise the score only in the frame where the non-language speech is inputted by adding the estimate value to the garbage acoustic score, the estimate value being calculated in the estimate value calculation step, and the garbage acoustic score being calculated in the garbage acoustic score calculation step; and a recognition result output step of outputting, as the recognition result of the unidentified input speech, the word string with the highest cumulative score of the language score, the word acoustic score and the garbage acoustic score which is corrected by the garbage acoustic score correction step.

\* \* \* \* \*